(12) United States Patent
Chiba et al.

(10) Patent No.: US 8,306,968 B2
(45) Date of Patent: Nov. 6, 2012

(54) NAME RETRIEVAL METHOD AND NAME RETRIEVAL APPARATUS

(75) Inventors: Kazuomi Chiba, Fukushima (JP); Yuko Watanabe, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 13/218,042

(22) Filed: Aug. 25, 2011

(65) Prior Publication Data

US 2012/0066244 A1 Mar. 15, 2012

(30) Foreign Application Priority Data

Sep. 15, 2010 (JP) ................................ 2010-206919

(51) Int. Cl.
*G06F 17/30* (2006.01)
(52) U.S. Cl. ......... 707/713; 707/765; 707/766; 707/759
(58) Field of Classification Search .................. 707/770, 707/749, 748, 708, 752, 758, 781, 767, 766, 707/917
See application file for complete search history.

(56) References Cited

U.S. PATENT DOCUMENTS

| | | | | |
|---|---|---|---|---|
| 4,255,796 A * | 3/1981 | Gabbe et al. ........................ | 1/1 |
| 4,433,392 A * | 2/1984 | Beaven ................ | 1/1 |
| 5,459,739 A * | 10/1995 | Handley et al. ............... | 714/797 |
| 5,845,278 A * | 12/1998 | Kirsch et al. .................. | 707/688 |
| 5,913,215 A * | 6/1999 | Rubinstein et al. ........... | 707/708 |
| 6,006,221 A * | 12/1999 | Liddy et al. ............................ | 1/1 |
| 6,169,986 B1 * | 1/2001 | Bowman et al. ...................... | 1/1 |
| 6,288,726 B1 | 9/2001 | Ballard | |
| 6,408,270 B1 * | 6/2002 | Garber .......................... | 704/251 |
| 6,411,950 B1 * | 6/2002 | Moricz et al. ......................... | 1/1 |
| 6,697,793 B2 * | 2/2004 | McGreevy ............................. | 1/1 |
| 6,978,264 B2 * | 12/2005 | Chandrasekar et al. .............. | 1/1 |
| 7,499,940 B1 * | 3/2009 | Gibbs .................................... | 1/1 |
| 7,512,596 B2 * | 3/2009 | Hajela et al. ......................... | 1/1 |
| 7,721,222 B1 * | 5/2010 | Shaik ............................ | 715/773 |
| 7,844,599 B2 * | 11/2010 | Kasperski et al. ............. | 707/713 |
| 8,001,101 B2 * | 8/2011 | Anderson et al. ............. | 707/706 |
| 8,122,034 B2 * | 2/2012 | Aravamudan et al. ........ | 707/752 |
| 8,190,628 B1 * | 5/2012 | Yang et al. .................... | 707/767 |
| 2002/0161570 A1 * | 10/2002 | Loofbourrow et al. .......... | 704/4 |
| 2003/0018621 A1 * | 1/2003 | Steiner et al. ..................... | 707/3 |
| 2003/0101172 A1 * | 5/2003 | De La Huerga .................. | 707/3 |
| 2003/0195877 A1 * | 10/2003 | Ford et al. ......................... | 707/3 |

(Continued)

FOREIGN PATENT DOCUMENTS

JP 2002-507289 3/2002

*Primary Examiner* — Sherief Badawi
(74) *Attorney, Agent, or Firm* — Brinks Hofer Gilson & Lione

(57) ABSTRACT

Name retrieval methods and name retrieval apparatuses that detect retrieval-target names that are representable as character strings including a ligature taking arbitrary property of a ligature into consideration in both a case where the ligature is input, and a case where the series of characters corresponding to the ligature is input, are provided so that convenience and reliability of name retrieval are improved. When a specific ligature is input, the specific ligature is converted into the series of characters corresponding to the specific ligature in accordance with the corresponding relationship TB stored in a storage device M, and specific retrieval-target names that include the series of characters obtained by the conversion in an input position of the specific ligature and an arrangement position of the series of characters corresponding to the number of coupled characters are retrieved from a database DB by character-string matching.

15 Claims, 8 Drawing Sheets

U.S. PATENT DOCUMENTS

| | | |
|---|---|---|
| 2003/0225755 A1* | 12/2003 | Iwayama et al. ............... 707/3 |
| 2003/0234821 A1* | 12/2003 | Pugliese .................. 345/816 |
| 2004/0006456 A1* | 1/2004 | Loofbourrow et al. ............ 704/4 |
| 2004/0021691 A1* | 2/2004 | Dostie et al. ............... 345/773 |
| 2004/0090465 A1* | 5/2004 | Robertson et al. ............ 345/780 |
| 2004/0143564 A1* | 7/2004 | Gross et al. .................. 707/1 |
| 2004/0153963 A1* | 8/2004 | Simpson et al. ........... 715/500.1 |
| 2005/0060343 A1* | 3/2005 | Gottsman et al. ............ 707/102 |
| 2005/0099407 A1* | 5/2005 | Pennington et al. .......... 345/179 |
| 2005/0256846 A1* | 11/2005 | Zigmond et al. ............... 707/3 |
| 2006/0064411 A1* | 3/2006 | Gross et al. ................. 707/3 |
| 2006/0106769 A1* | 5/2006 | Gibbs ........................ 707/3 |
| 2006/0173822 A1* | 8/2006 | Watson et al. ................ 707/3 |
| 2006/0190436 A1* | 8/2006 | Richardson et al. ............ 707/3 |
| 2006/0206454 A1* | 9/2006 | Forstall et al. ............... 707/3 |
| 2006/0259479 A1* | 11/2006 | Dai .......................... 707/4 |
| 2007/0005563 A1* | 1/2007 | Aravamudan et al. ........... 707/2 |
| 2007/0050339 A1* | 3/2007 | Kasperski et al. ............. 707/3 |
| 2007/0055652 A1* | 3/2007 | Hood et al. .................. 707/3 |
| 2007/0106500 A1* | 5/2007 | Loofbourrow et al. ......... 704/10 |
| 2007/0128899 A1* | 6/2007 | Mayer ...................... 439/152 |
| 2007/0143262 A1* | 6/2007 | Kasperski .................... 707/3 |
| 2007/0162422 A1* | 7/2007 | Djabarov ..................... 707/2 |
| 2007/0226198 A1* | 9/2007 | Kapur ........................ 707/3 |
| 2007/0244863 A1* | 10/2007 | Adams et al. ................. 707/3 |
| 2008/0016034 A1* | 1/2008 | Guha et al. .................. 707/3 |
| 2008/0077558 A1* | 3/2008 | Lawrence et al. .............. 707/3 |
| 2008/0088599 A1* | 4/2008 | Gunn et al. ................. 345/173 |
| 2008/0109401 A1* | 5/2008 | Sareen et al. ................ 707/3 |
| 2008/0168039 A1* | 7/2008 | Carpenter et al. ............. 707/3 |
| 2010/0010989 A1* | 1/2010 | Li et al. .................... 707/5 |
| 2010/0251162 A1* | 9/2010 | Stallings et al. ............ 715/777 |

* cited by examiner

NAME RETRIEVAL METHOD AND NAME RETRIEVAL APPARATUS

RELATED APPLICATIONS

The present application claims priority to Japanese Patent Application Serial Number 2010-206919, filed Sep. 15, 2010, the entirety of which is hereby incorporated by reference.

BACKGROUND OF THE INVENTION

1. Field of the Invention

The present invention relates to name retrieval methods and name retrieval apparatuses, and particularly relates to a name retrieval method and a name retrieval apparatus which are suitable for performing retrieval by successively performing search refinement every time a character is input and displaying a result of the retrieval.

2. Description of the Related Art

Conventionally, a navigation apparatus enables retrieval of a retrieval-target name such as an address name or a POI (Points of Interest) name. The apparatus provides for a character input to retrieve a destination from a database that stores character string data corresponding to a retrieval-target name.

Furthermore, at a time of such name retrieval, conventionally, fuzzy matching may be used to retrieve a retrieval-target name that includes a symbol such as a hyphen or a comma without inputting the symbol. The retrieval is performed by replacing a special character (such as an alphabet with an umlaut mark or an alphabet with a ring) with a normal alphabet. However, in other cases, except for such exceptions, a retrieval-target name is generally retrieved only when a character string that is input is the same as that representing the retrieval-target name stored in the database.

As an example, in Arabic-speaking countries, when a plurality of specific characters are sequentially arranged in a certain order, a series of the characters can be united with one another so as to be represented by a ligature. However, in a navigation system that supports Arabic, different character codes are assigned to a certain ligature and a series of characters corresponding to the ligature (obtained by cancelling the ligature unit).

For example, three different character codes are assigned to a ligature "Lam alif" (represented by alphabetical characters for convenience sake) and characters "Lam" and "alif" that correspond to the ligature "Lam alif" (for example, Lam: 0644, alif: 0627, and Lam alif: FEFB).

If only the character "Lam" is input when a retrieval-object name is to be retrieved, a retrieval-target name is not detected that includes "Lam alif" which has the character code different from that of "Lam". Similarly, if the ligature "Lam alif" is input, a retrieval-target name is not detected that includes "Lam+alif" (series of two characters) which has the character code different from that of the ligature "Lam alif".

Retrieval leakage of a retrieval-target name depends on not only a character code, but also on an arbitrary determination as to whether the series of characters is used as a ligature (hereinafter referred to as arbitrary property of a ligature).

Specifically, in a database included in a navigation apparatus, although original data is compiled by a compiler, a creator of the original data determines whether retrieval-target names to be stored in the original data which may be represented by a ligature are stored using a ligature. However, in many cases, the determination is made by following a notation system of local signboards. Then, according to the arbitrary property of a ligature, the local signboards may use character strings using ligatures or may use character strings using series of a plurality of characters corresponding to the ligatures. Therefore, in the database, retrieval-target names represented by a ligature corresponding to a series of a plurality of characters and retrieval-target names represented by a series of a plurality of characters are often mixed. This encourages the retrieval leakage of retrieval-target names.

In Japanese Unexamined Patent Application Publication (Translation of PCT Application) No. 2002-507289, a technique of identifying and displaying an alternative glyph (ligature) in text has been proposed. In such a technique, display is performed taking a ligature into consideration.

However, although taking a ligature into consideration only when display is performed, the technique disclosed in Japanese Unexamined Patent Application Publication (Translation of PCT Application) No. 2002-507289 does not support name retrieval taking the arbitrary property of a ligature into consideration.

SUMMARY OF THE INVENTION

Accordingly, the present invention has been made in view of this point and an object of the present invention is to provide a name retrieval method and a name retrieval apparatus that enables detection of a retrieval-target name that may be represented by a character string including a ligature in either the case where the retrieval-target name has been input using a specific ligature or the case where the retrieval-target name has been input using a series of characters corresponding to the ligature taking the arbitrary property of a ligature into consideration, thereby improving convenience and reliability of name retrieval.

In some implementations of a first embodiment of the present invention, there is provided a name retrieval method performed to store retrieval-target names in a database as character string data, to retrieve the retrieval-target names which include a character input by an input device by sequentially performing search refinement every time a character is input, and to display a result of the retrieval in a display unit. The name retrieval method includes a first step of storing, in the database, all specific retrieval-target names, among the retrieval-target names, which are representable as character strings including a specific ligature obtained by coupling specific characters arranged in series with each other in a specific order as a single character and which are representable as character strings including the series of specific characters without change, as character strings having the series of characters without change. In a second step, the correspondence relationship between the specific ligature and the series of characters in a storage device is stored. In a third step, a first key used to input the specific ligature and a second key used to input a leading character of the series of characters to the input device are assigned. In a fourth step, when the specific ligature is input by being selected by the first key, the input specific ligature is converted into the series of characters corresponding to the specific ligature in accordance with the correspondence relationship stored in the storage device and specific retrieval-target names are retrieved that include the series of characters that are obtained by the conversion in an input position of the specific ligature and in a character arrangement position of the series of characters corresponding to the number of coupled characters from the database by character-string matching. In a fifth step, when the leading character is input by being selected by the second key, specific retrieval-target names and the other retrieval-target names are retrieved that include the input leading character in a character arrangement position corresponding to an input position of the leading character from the database by the character-string matching.

In some implementations of a second embodiment of the present invention, there is provided a name retrieval apparatus that includes a database that stores retrieval-target names as character string data and that stores all specific retrieval-target names, among the retrieval-target names, which are representable as character strings including a specific ligature obtained by coupling specific characters arranged in series with each other in a specific order as a single character and which are representable as character strings including the series of specific characters without change, as character strings having the series of characters without change. The apparatus further includes an input device that allows character input for retrieval of the retrieval-target names, a retrieval device which retrieves the retrieval-target names that include a character input by the input device from the database by sequentially performing search refinement every time a character is input, a retrieval-result display device which displays a result of the retrieval performed by the retrieval device, and a storage device which stores the correspondence relationship between the specific ligature and the series of characters. The apparatus additionally includes a key assigning device that assigns a first key used to input the specific ligature and a second key used to input a leading character of the series of characters to the input device, and a retrieval control device that controls the retrieval of the retrieval-target names performed by the retrieval device. When the specific ligature is input by being selected by the first key, the retrieval control device causes the retrieval device to convert the input specific ligature into the series of characters corresponding to the specific ligature in accordance with the correspondence relationship stored in the storage device and to retrieve the specific retrieval-target names that include the series of characters that are obtained by the conversion in an input position of the specific ligature and in a character arrangement position of the series of characters corresponding to the number of coupled characters from the database by character-string matching. When the leading character is input by being selected by the second key, the retrieval control device causes the retrieval device to retrieve the specific retrieval-target names and the other retrieval-target names that include the input leading character in a character arrangement position corresponding to an input position of the leading character from the database by the character-string matching.

Here, the term "input position" of the specific ligature or the leading character means an arrangement position (an order of the ligature or the leading character) of an input character in an entire valid input result (except for deleted character) in a current time (when the input is performed). For example, when only the input character is valid at a current time, the "input position" of the character corresponds to the first character, that is, a leading character (hereinafter the same shall apply).

Furthermore, the term "the specific retrieval-target names and the other retrieval-target names" means concept of the retrieval-target names including the specific retrieval-target names (hereinafter the same shall apply).

In some implementations of the name retrieval method and the name retrieval apparatus of the first and second embodiments, when the specific ligature is input, the specific ligature can be converted into the series of characters corresponding to the specific ligature in accordance with the correspondence relationship stored in the storage device, and the specific retrieval-target names which include the series of characters obtained by the conversion in an input position of the specific ligature and an arrangement position of the series of characters corresponding to the number of coupled characters can be retrieved from the database by the character-string matching. On the other hand, when the leading character of the series of characters corresponding to the specific ligature is input, the specific retrieval-target names and the other retrieval-target names which include the input leading character in a character arrangement position corresponding to an input position of the leading character can be retrieved from the database by the character-string matching. Accordingly, since the retrieval-target names which are representable as character strings including the ligature can be detected in both the case where the ligature is input and the case where the series of characters is input taking arbitrary property of a ligature into consideration, convenience and reliability of the name retrieval can be improved.

In some implementations of a third embodiment of the present invention, there is provided a name retrieval method performed to store retrieval-target names in a database as character string data, to retrieve the retrieval-target names that include a character input by an input device by sequentially performing search refinement every time a character is input, and to display a result of the retrieval in a display unit. The name retrieval method includes a first step of storing, in the database, all specific retrieval-target names, among the retrieval-target names, which are representable as character strings including a specific ligature obtained by coupling specific characters arranged in series with each other in a specific order as a single character and which are representable as character strings including the series of specific characters without change, as character strings having the specific ligature; a second step of storing the correspondence relationship between the specific ligature and the series of characters in a storage device; a third step of assigning a first key used to input the specific ligature and a second key used to input a leading character of the series of characters to the input device; a fourth step of retrieving the specific retrieval-target names which include the input specific ligature in a character arrangement position corresponding to an input position of the specific ligature from the database by character-string matching, when the specific ligature is input by being selected by the first key; and a fifth step of retrieving the retrieval-target names which include the input leading character in a character arrangement position corresponding to an input position of the leading character from the database by the character-string matching, obtaining the specific ligature corresponding to the input leading character in accordance with the correspondence relationship stored in the storage device, and retrieving the specific retrieval-target names which include the obtained specific ligature in a character arrangement position corresponding to the input position of the leading character from the database by the character-string matching, when the leading character is input by being selected by the second key.

In some implementations of a fourth embodiment of the present invention, there is provided a name retrieval apparatus including a database which stores retrieval-target names as character string data and which stores all specific retrieval-target names, among the retrieval-target names, which are representable as character strings including a specific ligature obtained by coupling specific characters arranged in series with each other in a specific order as a single character and which are representable as character strings including the series of specific characters without change, as character strings having the specific ligature, an input device which allows character input for retrieval of the retrieval-target names. The apparatus may further include a retrieval device that retrieves the retrieval-target names that include a character input by the input device from the database by sequentially performing search refinement every time a character is input, a retrieval-result display device which displays a result of the retrieval performed by the retrieval device, a storage device which stores the correspondence relationship between the specific ligature and the series of characters, a key assigning device which assigns a first key used to input the specific ligature and a second key used to input a leading character of the series of characters to the input device, and a retrieval control device which controls retrieval of the retrieval-target names performed by the retrieval device. When the specific ligature is input by being selected by the first key, the retrieval control device causes the retrieval device to retrieve the specific retrieval-target names which include the input specific ligature in a character arrangement position corresponding to an input position of the specific ligature from the database by character-string matching. When the leading character is input by being selected by the second key, the retrieval control device causes the retrieval device to retrieve the retrieval-target names which include the input leading character in a character arrangement position corresponding to an input position of the leading character from the database by the character-string matching, to obtain the specific ligature corresponding to the input leading character in accordance with the correspondence relationship stored in the storage device, and to retrieve the specific retrieval-target names which include the obtained specific ligature in a character arrangement position corresponding to the input position of the leading character from the database by the character-string matching.

In some implementations of the name retrieval method and the name retrieval apparatus of the third and fourth embodiments, when the specific ligature is input, the specific retrieval-target names that include the input specific ligature in a character arrangement position corresponding to an input position of the specific ligature can be retrieved from the database by the character-string matching. On the other hand, when the leading character of the series of characters corresponding to the specific ligature is input, the specific retrieval-target names that include the input leading character in a character arrangement position corresponding to an input position of the leading character can be retrieved from the database by the character-string matching, the specific ligature corresponding to the input leading character can be obtained in accordance with the correspondence relationship stored in the storage device, and the specific retrieval-target names that include the obtained specific ligature in a character arrangement position corresponding to an input position of the leading character can be retrieved from the database by the character-string matching. Accordingly, as with the embodiments described above, since the retrieval-target names that are representable as character strings including the ligature can be detected in both the case where the ligature is input and the case where the series of characters is input taking arbitrary property of a ligature into consideration, convenience and reliability of the name retrieval can be improved.

In some implementations of a fifth embodiment of the present invention, there is provided a name retrieval method performed to store retrieval-target names in a database as character string data, to retrieve the retrieval-target names which include a character input by an input device by sequentially performing search refinement every time a character is input, and to display a result of the retrieval in a display unit. The name retrieval method includes a first step of storing, in the database, specific retrieval-target names, among the retrieval-target names, which are representable as character strings including a specific ligature obtained by coupling specific characters arranged in series with each other in a specific order as a single character and which are representable as character strings including the series of specific characters without change, as character strings having the specific ligature or character strings having the series of characters without change, a second step of storing the correspondence relationship between the specific ligature and the series of characters in a storage device, a third step of assigning a first key used to input the specific ligature and a second key used to input a leading character of the series of characters to the input device, a fourth step of retrieving the specific retrieval-target names which include the input specific ligature in a character arrangement position corresponding to an input position of the specific ligature from the database by character-string matching, converting the input specific ligature into the series of characters corresponding to the specific ligature in accordance with the correspondence relationship stored in the storage device, and retrieving the specific retrieval-target names which include the series of characters obtained by the conversion in an input position of the specific ligature and an arrangement position of the series of characters corresponding to the number of coupled characters from the database by the character-string matching, when the specific ligature is input by being selected by the first key, and a fifth step of retrieving the specific retrieval-target names and the other retrieval-target names which include the input leading character in a character arrangement position corresponding to an input position of the leading character from the database by the character-string matching, obtaining the specific ligature corresponding to the input leading character in accordance with the correspondence relationship stored in the storage device, and retrieving the specific retrieval-target names which include the obtained specific ligature in a character arrangement position corresponding to the input position of the leading character from the database by the character-string matching, when the leading character is input by being selected by the second key.

In some implementations of a sixth embodiment of the present invention, there is provided a name retrieval apparatus including a database which stores retrieval-target names as character string data and which stores all specific retrieval-target names, among the retrieval-target names, which are representable as character strings including a specific ligature obtained by coupling specific characters arranged in series with each other in a specific order as a single character and which are representable character strings including the series of specific characters without change, as character strings having the specific ligature or as character strings having the series of characters without change. The apparatus may additionally include an input device that allows character input for retrieval of the retrieval-target names, a retrieval device that retrieves the retrieval-target names which include a character input by the input device from the database by sequentially performing search refinement every time a character is input, a retrieval-result display device that displays a result of the retrieval performed by the retrieval device, a storage device that stores the correspondence relationship between the specific ligature and the series of characters, a key assigning device that assigns a first key used to input the specific ligature and a second key used to input a leading character of the series of characters, and a retrieval control device which controls retrieval of the retrieval-target names performed by the retrieval device. When the specific ligature is input, the retrieval control device causes the retrieval device to retrieve the specific retrieval-target names that include the input specific ligature in a character arrangement position corresponding to an input position of the specific ligature from the database by character-string matching, to convert the input specific ligature into the series of characters in accordance with the corresponding relationship stored in the storage device, and to retrieve the specific retrieval-target names which include the series of characters obtained by the conversion in an input position of the specific ligature and in a character arrangement position for the series of characters corresponding to the number of coupled characters from the database by the character-string matching. When the leading character is input by being selected by the second key, the retrieval control device causes the retrieval device to retrieve the specific retrieval-target names and the other retrieval-target names which include the input leading character in a character arrangement position corresponding to an input position of the leading character from the database by the character-string matching, to obtain the specific ligature corresponding to the input leading character in accordance with the correspondence relationship stored in the storage device, and to retrieve the specific retrieval-target names which include the obtained specific ligature in a character arrangement position corresponding to the input position of the leading character from the database by the character-string matching.

In some implementations of the name retrieval method and the name retrieval apparatus of the fifth and sixth embodiments, when the specific ligature is input, the specific retrieval-target names which include the input specific ligature in a character arrangement position corresponding to an input position of the specific ligature can be retrieved from the database by the character-string matching, the input specific ligature can be converted in to the series of characters corresponding to the specific ligature in accordance with the correspondence relationship stored in the storage device, and the specific retrieval-target names which include the series of characters obtained by the conversion can be in an input position of the specific ligature and an arrangement position of the series of characters corresponding to the number of coupled characters can be retrieved from the database by the character-string matching. On the other hand, when the leading character of the series of characters corresponding to the specific ligature is input, the specific retrieval-target names and the other retrieval-target names which include the input leading character in a character arrangement position corresponding to an input position of the leading character can be retrieved from the database by the character-string matching, the specific ligature corresponding to the input leading character is obtained in accordance with the correspondence relationship stored in the storage device, and the specific retrieval-target names which include the obtained specific ligature in a character arrangement position corresponding to an input position of the leading character can be retrieved from the database by the character-string matching. Accordingly, as with the first to fourth embodiments described above, since the retrieval-target names which are representable as character strings including the ligature can be detected in both the case where the ligature is input and the case where the series of characters is input taking arbitrary property of a ligature into consideration, convenience and reliability of the name retrieval can be improved.

Note that, in the name retrieval method and the name retrieval apparatus of the foregoing first and second embodiments, the assignment of the first key may be performed when the specific retrieval-target names which include the series of characters in a character arrangement position corresponding to an input position of series of characters to be newly input have been stored in the database, and the assignment of the second key may be performed when the specific retrieval-target names and the other retrieval-target names which include the leading character in a character arrangement position corresponding to an input position of a character to be newly input have been stored in the database.

Furthermore, in the name retrieval method and the name retrieval apparatus of the foregoing third and fourth embodiments, the assignment of the first key may be performed when the specific retrieval-target names which include the specific ligature in a character arrangement position corresponding to an input position of a character to be newly input have been stored in the database, and the assignment of the second key may be performed when the specific retrieval-target names and the other retrieval-target names which include the leading character or the specific ligature in a character arrangement position corresponding to an input position of a character to be newly input have been stored in the database.

Moreover, in the name retrieval method and the name retrieval apparatus of the foregoing fifth and sixth embodiments, the assignment of the first key may be performed when the specific retrieval-target names which include the specific ligature in a character arrangement position corresponding to a character to be newly input or the specific retrieval-target names which include the series of characters in a character arrangement position corresponding to an input position of series of characters to be newly input have been stored in the database, and the assignment of the second key may be performed when the specific retrieval-target names and the other retrieval-target names which include the leading character or the specific ligature in a character arrangement position corresponding to an input position of a character to be newly input have been stored in the database.

By setting conditions of the key assignment corresponding to the name retrieval methods and the name retrieval apparatuses according to the first to sixth embodiments, the first and second keys are prevented from being assigned when a retrieval-target name to be detected in retrieval which is started or continued by inputting the specific ligature or the leading character is not included in the database, and accordingly, wasted character input for useless retrieval which obtains no retrieval result can be avoided.

Furthermore, according to the name retrieval methods according to the first and third embodiments, the specific retrieval-target names may be stored in the database when original data is compiled into the database. In these methods, when the original data is compiled into the database, determinations as to whether the ligature is used in the individual specific retrieval-target names to be stored in the database can be unified. Accordingly, a processing load applied when the specific retrieval-target names are retrieved by inputting a character can be reduced.

Furthermore, in the name retrieval method according to the fifth embodiment, the specific retrieval-target names may be stored in the database when original data is compiled into the database. Here, the specific retrieval-target names may be stored in the database as character strings in which states of presence/absence of a ligature are the same as those of the original data. Then, according to this method, even when the state of presence/absence of a ligature of the original data is reflected by states of presence/absence of a ligature of the specific retrieval-target names to be stored in the database, all the specific retrieval-target names can be retrieved by making use of direct character-string matching and indirect character-string matching using the correspondence relationship in both the case where the specific ligature is input and the case where the leading character of the series of characters corresponding to the specific ligature is input.

Moreover, according to the name retrieval methods and the name retrieval apparatus of the first to sixth embodiments, the retrieval-result display device may display all the specific retrieval-target names detected by the retrieval device as character strings including the specific ligature. By this, since results of the retrieval of the individual specific retrieval-target names may be displayed so as to equally include the specific ligature, visibility of the retrieval results can be improved.

Moreover, according to the name retrieval methods and the name retrieval apparatus of the first to sixth embodiments, the retrieval-result display device may display all the specific retrieval-target names detected by the retrieval device as character strings including the series of characters without change. By this, since results of the retrieval of the individual specific retrieval-target names may be displayed so as to equally include the series of characters without change, visibility of the retrieval results can be improved.

Moreover, according to the name retrieval methods and the name retrieval apparatus of the first to sixth embodiments, the retrieval-result display device may display the specific retrieval-target names detected by the retrieval may be displayed as character strings including the specific ligature or the series of characters in accordance with a character input for the retrieval. By this, since results of the retrieval of the individual specific retrieval-target names may be displayed so as to equally include characters in accordance with characters input for the retrieval, the retrieval results by which preference of a user is reflected can be displayed.

Furthermore, according to the name retrieval methods and the name retrieval apparatus of the first to sixth embodiments, the retrieval-result display device may display specific retrieval-target names, among the specific retrieval-target names detected by the retrieval device, which include a certain ligature as the specific ligature as character strings including the certain ligature and display specific retrieval-target names, among the specific retrieval-target names detected by the retrieval device, which include the specific ligature other than certain ligature as character strings which include the series of characters without change. By this, since only the retrieval-target names including the certain ligature may be displayed using the ligature as results of the retrieval, wide variations of a display state of the results of the retrieval of the retrieval-target names may be attained.

Furthermore, according to the name retrieval methods and the name retrieval apparatus of the first to sixth embodiments, a language of character strings representing the retrieval-target names and a language of a character used to perform retrieval of the retrieval-target names may include the Arabic language. By this, retrieval-target names which are described by the Arabic language and which are representable as character strings including a ligature may be detected in both the case where the ligature is input and the case where the series of characters corresponding to the ligature is input.

Furthermore, according to the name retrieval methods and the name retrieval apparatus of the first to sixth embodiments, the name retrieval apparatus may be mounted on a navigation apparatus, and the retrieval-target names may include at least one of an address name, a POI name, and a street name. With this configuration, in the navigation apparatus, the address name, the POI name, or the street name which includes the ligature may be detected in both the case where the ligature is input and the case where the series of characters corresponding to the ligature is input.

In some implementations of embodiments of the present invention, retrieval-target names which are representable as character strings including a ligature can be detected in both the case where the ligature is input and the case where the series of characters corresponding to the ligature is input, and furthermore, convenience and reliability of name retrieval are improved.

DESCRIPTION OF THE PREFERRED EMBODIMENTS

A First Embodiment of a Name Retrieval Method

Implementations of a first embodiment of a name retrieval method is described with reference to FIGS. 1 to 4. In this embodiment, retrieval-target names are stored in a database as character string data. Then, retrieval-target names including a character input using an input device is retrieved from the database by sequentially performing search refinement every time a character is input. A result of the retrieval is displayed in a display unit in response to a user's request.

Furthermore, in this embodiment, a retrieval method is used to ensure a degree of freedom of character input and reliability of detection when specific retrieval-target names are to be retrieved. Note that the "specific retrieval-target name" may be represented by a character string including a specific ligature generated by connecting specific characters arranged in series in a predetermined order to each other to be a single character, and may be represented by a character string including the characters arranged in series without change (not as a ligature). For example, in the Arabic language, since a determination as to whether a ligature is used for representing a character string is arbitrarily made as described above, retrieval-target names represented by the Arabic language correspond to the specific retrieval-target names. In this case, each of ligatures represented by the Arabic language may be the specific ligature.

Figure 1:
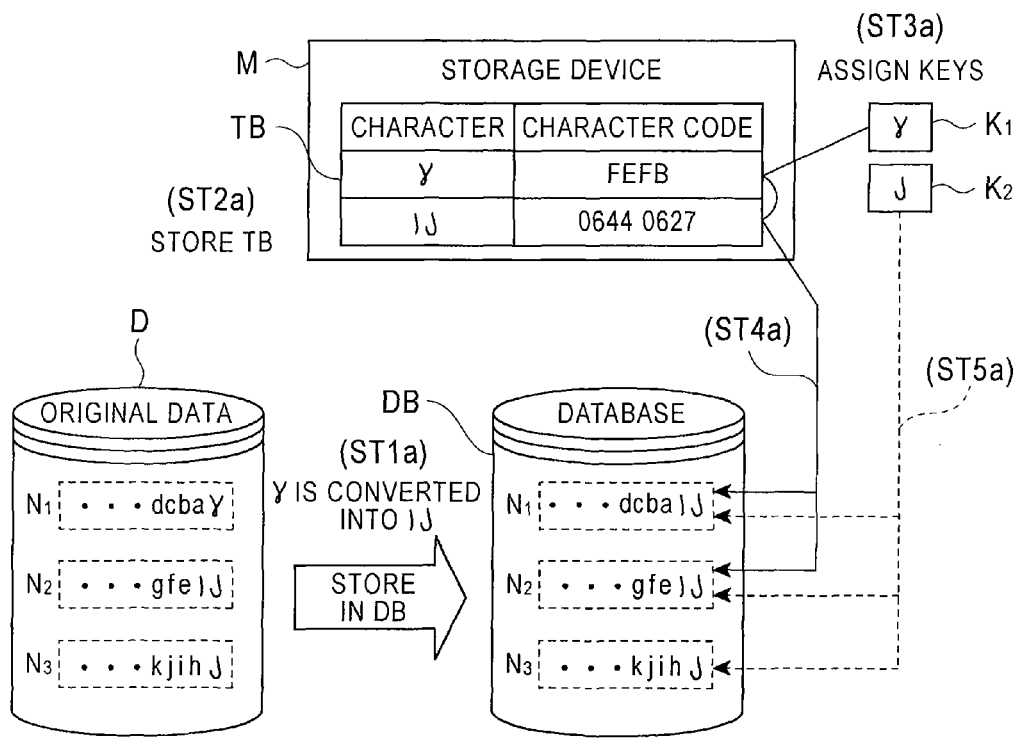
FIG. 1 is a conceptual diagram schematically illustrating a first embodiment of a name retrieval method.

One implementation of a name retrieval method according to this embodiment, which is suitable for retrieval of such specific retrieval-target names, is shown in FIG. 1. In this embodiment, first, as shown in step S1a (ST1a) of FIG. 1, all specific retrieval-target names to be stored in a database DB are stored in the database DB as character strings which include the above-described characters arranged in series (hereinafter referred to as "ligature-correspondence series characters").

Specifically, in step S1a (ST1a), when original data D corresponding to the database DB is compiled by a compiler into the database DB, all specific retrieval-target names included in retrieval-target names stored in the original data D are converted into, or maintained as, character strings including ligature-correspondence series characters without change to be stored in the database DB. Note that the compiling is a process of converting the original data into data that is available for a certain purpose in a computer. Specifically, in this embodiment, the compiling may include a process of converting the retrieval-target names stored in the original data into data that is available for name retrieval in the database. However, such compiling is a known technique that is normally performed when a database is generated, and therefore, descriptions of portions other than portions unique to this embodiment will be omitted.

As shown in FIG. 1, the original data D includes three retrieval-target names represented by the Arabic language, i.e., a first retrieval-target name $N_1$, a second retrieval-target name $N_2$, and a third retrieval-target name $N_3$. Among these retrieval-target names, the first retrieval-target name $N_1$ is a character string including a specific ligature "Lam alif" as the first character. Since the first retrieval-target name $N_1$ can be represented by a series of two characters (Lam+alif) serving as ligature-corresponding series characters including a character "Lam" followed by a character "alif" which correspond to the ligature "Lam alif" according to the arbitrary property of a ligature described above, the first retrieval-target name $N_1$ corresponds to the specific retrieval-target name. The second retrieval-target name $N_2$ is represented by a character string corresponding to ligature-correspondence series characters including the series of characters "Lam" and "alif" as the first and second characters, respectively. In the second retrieval-target name $N_2$, portions corresponding to the characters "Lam" and "alif" can be represented by the character "Lam alif" according to the arbitrary property of a ligature, and therefore, similarly to the first retrieval-target name $N_1$, the second retrieval-target name $N_2$ corresponds to the specific retrieval-target name. On the other hand, although the third retrieval-target name $N_3$ includes a character "Lam" as the first character, the second character does not correspond to the character "alif", and therefore, the specific ligature may not replace these two characters. Accordingly, the third retrieval-target name $N_3$ does not correspond to the specific retrieval-target name. Note that, in FIG. 1, characters other than the Arabic characters are represented by alphabetical characters for convenience sake.

As described above, in the original data D, specific retrieval-target names may be stored using the specific ligature (in the case of the first retrieval-target name $N_1$) or using the ligature-correspondence series characters (in the case of second retrieval-target name $N_2$) according to the arbitrary property of a ligature.

Accordingly, in step 1a (ST1a), as for the specific retrieval-target name (first retrieval-target name $N_1$) stored using the specific ligature in the original data D, a portion corresponding to the specific ligature (Lam alif) is converted into the ligature-correspondence series characters (Lam+alif) to be stored in the database DB. On the other hand, the specific retrieval-target name (second retrieval-target name $N_2$) stored using the ligature-correspondence series characters in the original data D is stored in the database DB as character string data without changing the number of characters, types of character, and arrangement of the characters. In this case, the retrieval-target name (third retrieval-target name $N_3$) which is stored in the original data D and which is not the specific retrieval-target name is stored in the database DB as character string data.

Next, as shown in step 2a (ST2a) in FIG. 1, a correspondence table TB representing the correspondence relationship between the specific ligature (Lam alif) and the ligature-correspondence series characters (Lam+alif) is stored in a storage device M. The correspondence table TB may represent the correspondence relationship between a character code of the specific ligature (Lam alif) and character codes of the ligature-correspondence series characters (Lam+alif). Furthermore, the storage device M may be used to store the database DB. In this case, the correspondence table TB may be stored in the database DB.

Next, as shown in step 3a (ST3a) in FIG. 1, a first key $K_1$ used to input the specific ligature (Lam alif) and a second key $K_2$ used to input a leading character (Lam) of the ligature-correspondence series characters (Lam+alif) are assigned to an input device. Here, it is apparent that a key used to input a character other than the specific ligature (Lam alif) and the leading character (Lam) can be assigned.

Figure 2:
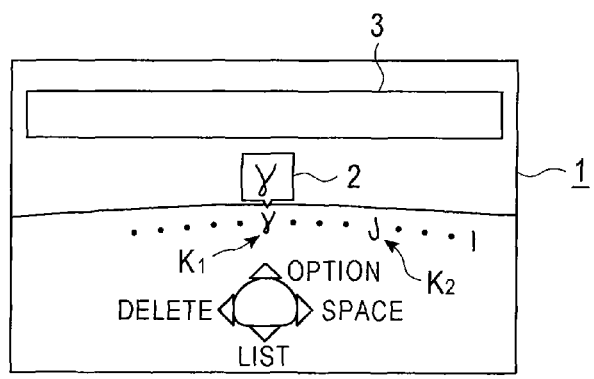
FIG. 2 is a diagram schematically illustrating a character input screen used in the name retrieval method.

Here, as shown in FIG. 2, the assignment of the first and second keys $K_1$ and $K_2$ is performed by displaying the specific ligature (Lam alif) and the leading character (Lam) in selectable states in a character input screen 1 which accepts character input for name retrieval. Note that, in the character input screen 1 shown in FIG. 2, a desired character can be specified by a cursor 2 from among a plurality of characters displayed as candidates of character input in an alignment manner by rotating a job dial serving as an operation unit of the input device. In FIG. 2, characters including the ligature "Lam alif" or the character "Lam" are displayed so as to be selectable by the cursor 2. A character specified by the cursor 2 is input by a selection operation, such as a press of a jog dial, so that a specified character is displayed in a character input field 3 such that the currently-specified character follows a specified character which is input immediately before the currently-specified character in a writing direction of a language (from right to left in the case of the Arabic language). Then, every time the character input is performed for each character, search refinement of the retrieval-target names internally progresses.

Note that the assignment of the first key $K_1$ may be performed when a specific retrieval-target name including ligature-correspondence series characters arranged in a character arrangement position corresponding to a position in which a series of characters to be newly input (corresponding to the number of characters equal to the number of characters included in the ligature-correspondence series characters) is input has been stored in the database DB. Furthermore, the assignment of the second key $K_2$ may be performed when a specific retrieval-target name or another retrieval-target name (that is, a specific retrieval-target name or a retrieval-target name other than the specific retrieval-target name) which includes a leading character of ligature-correspondence series characters in a character arrangement position corresponding to a position in which a character is to be newly input has been stored in the database DB. In this case, when the assignment of the keys is performed for display of selectable characters in the character input screen 1 as described above, characters to which the keys are not assigned may not be displayed or may be displayed in grayout, and the cursor 2 skips over the characters so that the characters are not selected or a determination operation (such as the press of the jog dial) is disabled even when the characters are specified.

Next, in this embodiment, as shown in step 4a (ST4a) in FIG. 1, when the specific ligature (Lam alif) is input by selection with the first key $K_1$, the input specific ligature (Lam alif) is converted into the ligature-correspondence series characters (Lam+alif) corresponding to the specific ligature (Lam alif) in accordance with the correspondence table TB stored in the storage device M. Then, specific retrieval-target names including the obtained ligature-correspondence series characters (Lam+alif) in an input position of the specific ligature (Lam alif) and in positions in which a series of characters corresponding to the number of coupled characters are arranged are retrieved from the database DB by character-string matching performed on the basis of character-code matching. Note that the character-string matching performed in step 4a (ST4a) is indirect character-string matching using the correspondence table TB. Here, in the example shown in FIG. 1, an input position of the specific ligature (Lam alif) corresponds to the first (leading) character, and the number of coupled characters of the ligature (Lam alif) is two. In this example, the positions where a plurality of characters are arranged in series (hereinafter referred to as a "series-character-matching-target-character-position group) corresponds to positions of the first and second characters. Therefore, in the example shown in FIG. 1, the first and second retrieval-target names $N_1$ and $N_2$ which include the character "Lam" as the first character and the character "alif" as the second character are detected in step 4a (ST4a). Note that, in a case where the input position of the specific ligature corresponds to the n-th character (n is an arbitrary natural number (hereinafter the same shall apply)) and the number of coupled characters of the specific ligature is m (m is an arbitrary natural number equal to or larger than 2 (hereinafter the same shall apply)), the series-character-matching-target-character-position group which is generalized is represented by character arrangement positions in a range from the n-th character to the n+m−1-th character. Note that when another ligature has been input before the specific ligature is input in step 4a (ST4a) (that is, when a retrieval-target name includes a plurality of ligatures), the series-character-matching-target-character-position group should be further shifted toward the character writing direction by the number smaller by 1 than the number of coupled characters of the other ligature. Furthermore, when fuzzy matching is used in this embodiment of the present invention, the series-character-matching-target-character-position group should be obtained after a character (symbol) to be ignored at the time of the character-string matching is removed from character arrangement.

On the other hand, as shown in step 5a (ST5a) of FIG. 1, when the leading character (Lam) of the ligature-correspondence series characters is input by selection with the second key $K_2$, the specific retrieval-target names and other retrieval-target names (that is, the specific retrieval-target names and retrieval-target names other than the specific retrieval-target names) that include the input leading character (Lam) in a character arrangement position corresponding to an input position of the leading character are retrieved from the database DB by the character-string matching. The character-string matching performed in step 5a (ST5a) is so-called indirect character-string matching which does not use the correspondence table TB. Note that, in the example shown in FIG. 1, the input position of the leading character (Lam) corresponds to the first character, and in this example, a character arrangement position corresponding to the input position of the leading character (Lam) (hereinafter referred to as a "leading-character-matching-target-character position") is the first character. Therefore, according to step 5a (ST5a), the first to third retrieval-target names $N_1$ to $N_3$ that include the character "Lam" as the first character are detected. Note that in a case where the input position of the leading character (Lam) corresponds to the n-th character, the leading-character-matching-target-character position that is generalized is represented by a character arrangement position corresponding to the n-th character. Note that, when the fuzzy matching is employed, the leading-character-matching-target-character position should be obtained after characters to be ignored at the time of the character-string matching are removed from the character arrangement.

Then, name retrieval is performed in accordance with character input including input of the specific ligature (Lam alif) or input of the leading character (Lam) while search refinement is sequentially performed every time the character is input.

Figure 3:
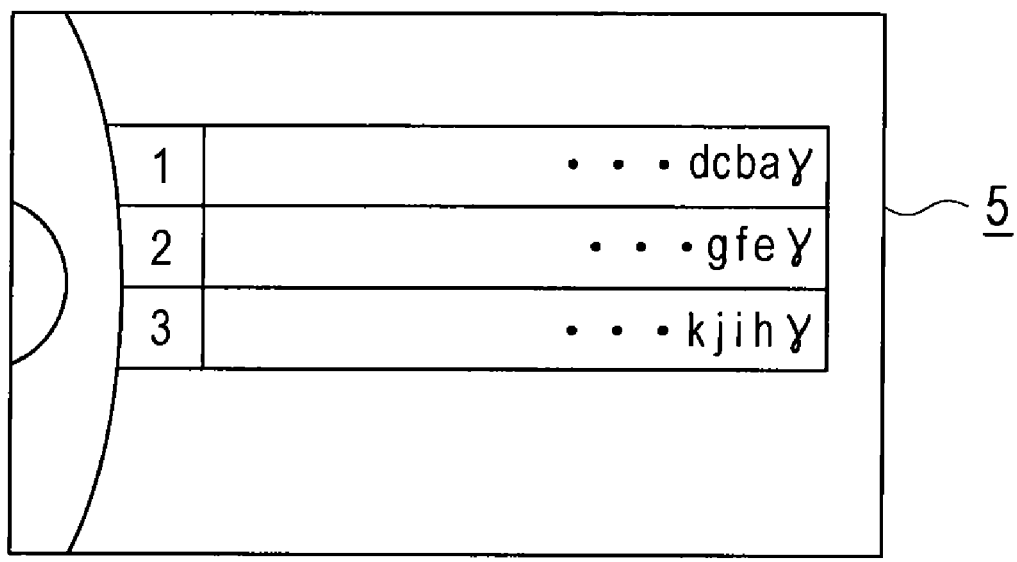
FIG. 3 is a diagram schematically illustrating a retrieval-result display screen used in the name retrieval method.

Note that, when the user performs an operation of instructing to display a result of the retrieval in the character input screen 1 as described above while the name retrieval is performed, a retrieval-result display screen 5 shown in FIG. 3 is displayed in the display unit, for example.

Figure 4:
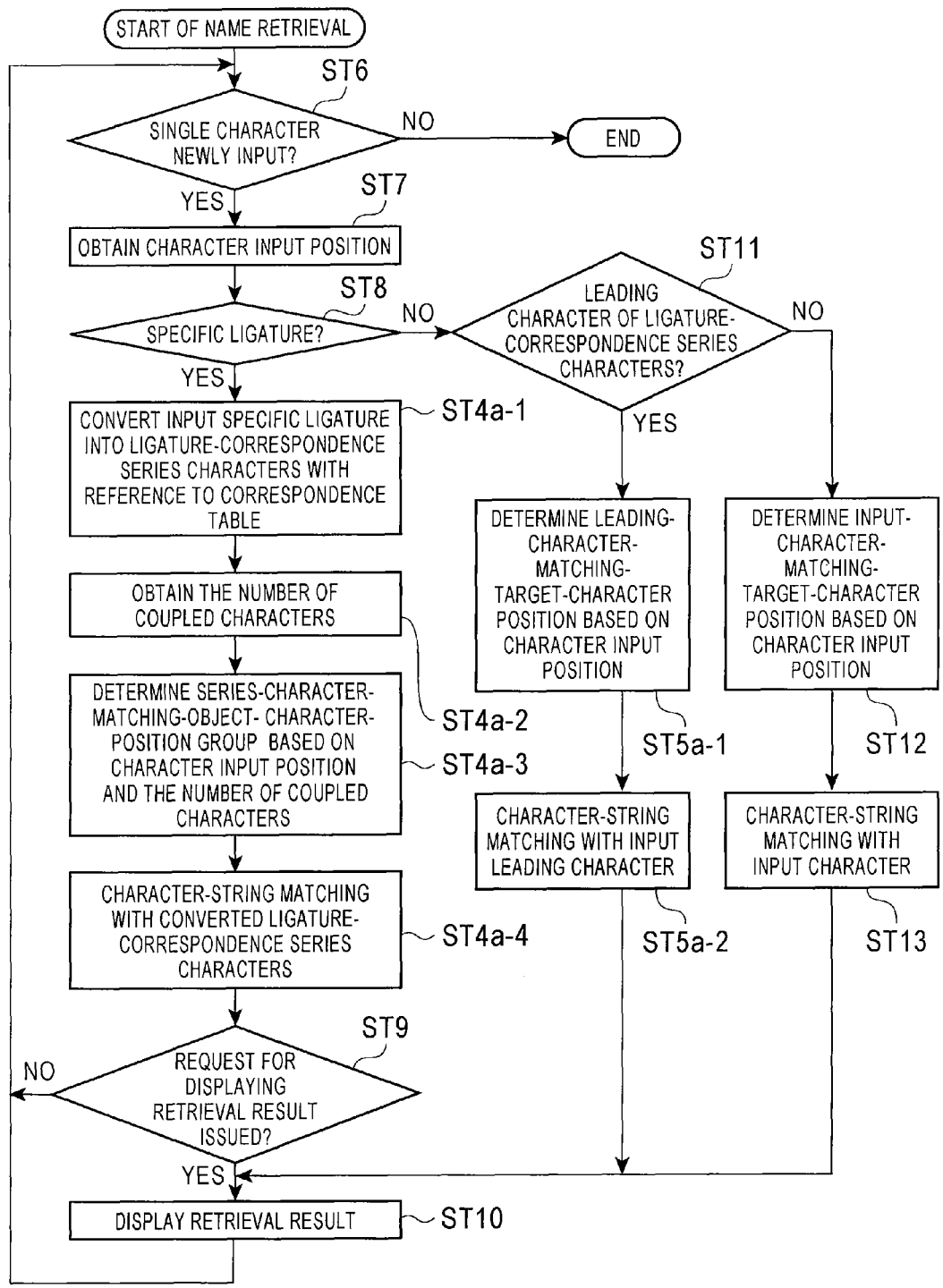
FIG. 4 is a flowchart illustrating the name retrieval method according.

Next, a process performed in an actual retrieval step after the retrieval-target names and the correspondence table TB are stored can be represented by generalization as shown in FIG. 4.

After the name retrieval using the database DB that stores the retrieval-target names is started, it is first determined whether a character is newly input in step 6 (ST6) in FIG. 4. When the determination is affirmative in step 6 (ST6), the process proceeds to step 7 (ST7), whereas when the determination is negative, the process is terminated.

In step 7 (ST7), an input position of the character (an order of the character) that is input in step 6 (ST6) is obtained. In step 8 (ST8), it is determined whether the character that is determined to be input in step 6 (ST6) is the specific ligature in accordance with a determination as to whether the character is selected by the first key $K_1$. When the determination is affirmative in step 8 (ST8), the process proceeds to step 4a-1 (ST4a-1), whereas when the determination is negative, the process proceeds to step 11 (ST11).

A process performed in step 4a-1 (ST4a-1) onwards will now be described. In step 4a-1 (ST4a-1), the input specific ligature is converted into ligature-correspondence series characters corresponding to the specific ligature with reference to the correspondence table TB. In step 4a-2 (ST4a-2), the number of coupled characters of the input specific ligature is obtained with reference to the correspondence table TB.

In step 4a-3 (ST4a-3), a series-character-matching-target-character-position group is determined in accordance with an input position of the character (specific ligature) obtained in step 7 (ST7) and the number of coupled characters of the specific ligature obtained in step 4a-2 (ST4a-2).

In step 4a-4 (ST4a-4), specific retrieval-target names including the ligature-correspondence series characters obtained by the conversion performed in step 4a-1 (ST4a-1) as the series-character-matching-target-character-position group determined in step 4a-3 (ST4a-3) are retrieved from the database DB by the character-string matching. Here, when the refinement of the retrieval-target names has been performed, refinement is further performed on a group of retrieval-target names that has been subjected to the refinement. After step 4a-4 (ST4a-4), the process proceeds to step 9 (ST9).

In step 9 (ST9), it is determined whether a request for displaying a result of the retrieval is issued. When the determination is affirmative in step 9 (ST9), the process proceeds to step 10 (ST10), whereas when the determination is negative, the process returns to step 6 (ST6). In step 10 (ST10), the retrieval result is displayed in the display unit and the process returns to step 6 (ST6).

A process performed in step 11 (ST11) onwards will now be described. In step 11 (ST11), it is determined whether the character input in step 6 (ST6) is a leading character of ligature-correspondence series characters in accordance with a determination as to whether the character is selected by the second key $K_2$. When the determination is affirmative in step 11 (ST11), the process proceeds to step 5a-1 (ST5a-1), whereas when the determination is negative, the process proceeds to step 12 (ST12).

When the process proceeds to step 5a-1 (ST5a-1), an operation of step 5a-1 (ST5a-1) and an operation of step 5a-2 (ST5a-2) are sequentially performed. Specifically, in step 5a-1 (ST5a-1), a leading-character-matching-target-character position is determined in accordance with the input position of the character (leading character) obtained in step 7 (ST7). Then, in step 5a-2 (ST5a-2), specific retrieval-target names and other retrieval-target names which include the input leading character in the leading-character-matching-target-character position determined in step 5a-1 (ST5a-1) are retrieved from the database DB by the character-string matching. After step 5a-2 (ST5a-2), the process proceeds to step 9 (ST9).

On the other hand, when the process proceeds to step 12 (ST12), an operation of step 12 (ST12) and an operation of step 13 (ST13) are sequentially performed. Specifically, in step 12 (ST12), a character arrangement position (input-character-matching-target-character position) corresponding to the input position of the character (a character other than the specific ligature and the leading character) obtained in step 7 (ST7) is determined.

In step 13 (ST13), retrieval-target names including the input character in the input-character-matching-target-character position determined in step 12 (ST12) are retrieved from the database DB by the character-string matching. After step 13 (ST13), the process proceeds to step 9 (ST9).

Note that, when specific retrieval-target names are included in a result of the retrieval, all the included specific retrieval-target names may be displayed using the specific ligature or displayed using the ligature-correspondence series characters in step 10 (ST10). Alternatively, when the specific ligature is input as a character, the display may be performed using the specific ligature, whereas when the leading character of the ligature-correspondence series characters is input, the display may be performed using the ligature-correspondence series characters. Alternatively, when a certain ligature ("Lam alif", for example) among specific ligatures is included, the display may be performed using the certain ligature, whereas when another ligature among the specific ligatures which is other than the certain ligature is included, the display may be performed using the ligature-correspondence series characters.

According to this embodiment, when the specific ligature is input, the specific ligature is converted into ligature-correspondence series characters in accordance with the correspondence table TB and specific retrieval-target names which include the ligature-correspondence series characters obtained by the conversion in a series-character-matching-target-character-position group can be retrieved. On the other hand, when the leading character of the ligature-correspondence series characters is input, specific retrieval-target names and other retrieval-target names that include the input leading character in a leading-character-matching-target-character position can be retrieved. Accordingly, in both the case where the specific ligature is input and the case where the leading character of ligature-correspondence series characters is input, specific retrieval-target names can be detected.

A Second Embodiment of a Name Retrieval Method

Implementations of a second embodiment of a name retrieval method will be described below with reference to FIGS. 5 and 6, mainly in points that are different from the first embodiment of the name retrieval method described above.

Figure 5:
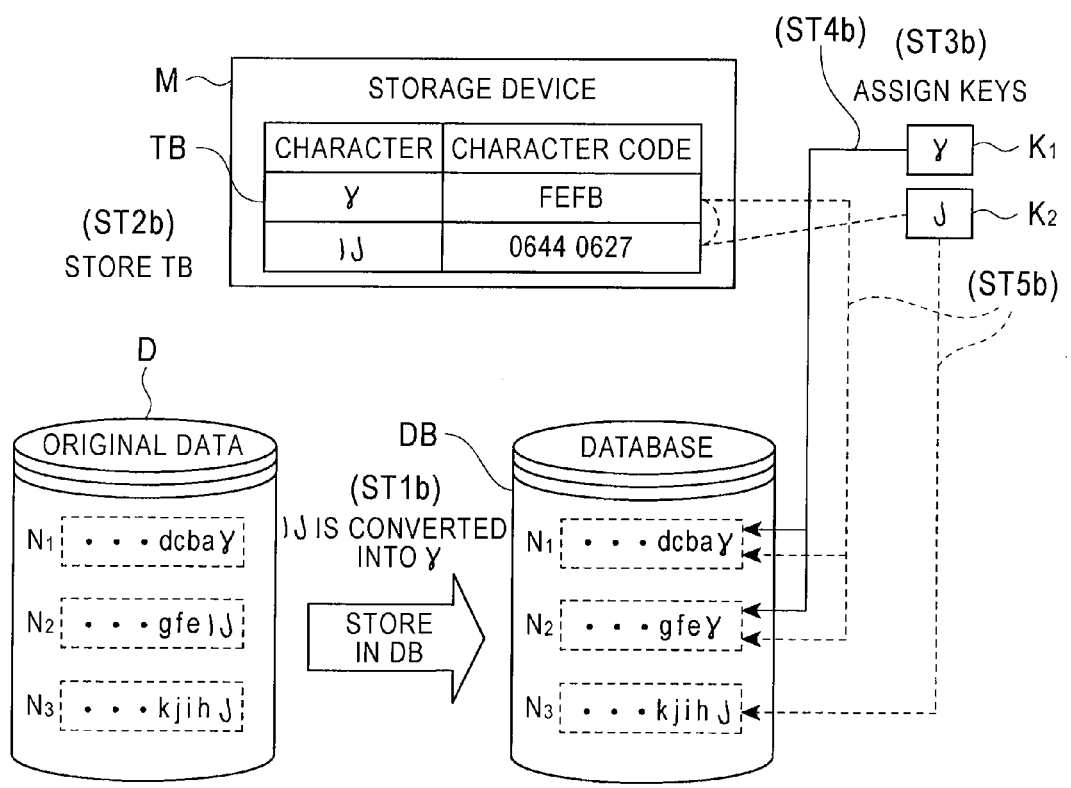
FIG. 5 is a conceptual diagram schematically illustrating a second embodiment of a name retrieval method.

An outline of the name retrieval method in this embodiment is shown in FIG. 5. In this embodiment, all the retrieval-target names described above are stored in a database DB as character strings, including the specific ligature described above as shown in step 1b (ST1b) of FIG. 5.

In step 1b (ST1b), when original data D is compiled by a compiler so that the database DB is obtained, all the specific retrieval-target names among retrieval-target names stored in the original data D are maintained as they are or converted into character strings including the specific ligature, and stored in the database DB. Note that, as shown in FIG. 5, the retrieval-target names stored in the original data D are the same as those shown in FIG. 1.

More specifically, in step 1b (ST1b), a specific retrieval-target name (first retrieval-target name $N_1$), which includes the specific ligature (Lam alif) and which has been stored in the original data D, is stored in the database DB as character string data without changing the number of characters, types of the characters, and arrangement of the characters. On the other hand, a specific retrieval-target name (second retrieval-target name $N_2$), which includes ligature-correspondence series characters (Lam+alif) and which has been stored in the original data D, is stored in the database DB after a portion corresponding to the ligature-correspondence series characters (Lam+alif) is converted into the specific ligature (Lam alif). Note that storage of a retrieval-target name (third retrieval-target name $N_3$) which is other than the specific retrieval-target names and which has been stored in the original data D is the same as that described in the first embodiment (that is, the third retrieval-target name $N_3$ is stored without change).

Next, as shown in step 2b (ST2b) of FIG. 5, a correspondence table TB representing the correspondence relationship between the specific ligature (Lam alif) and the ligature-correspondence series characters (Lam+alif) is stored in a storage device M. This process is the same as that performed in step 2a (ST2a) of the first embodiment, and therefore, a description thereof is also the same as that of the first embodiment.

In step 3b (ST3b) of FIG. 5, a first key $K_1$ used to input the specific ligature (Lam alif) and a second key $K_2$ used to input a leading character (Lam) of the ligature-corresponding series characters (Lam+alif) are assigned to an input device. This process is the same as that performed in step 3b (ST3b) of the first embodiment, and therefore, a description thereof is also the same as that of the first embodiment. Note that, in this embodiment, the assignment of the first key $K_1$ may be performed when specific retrieval-target names including the specific ligature in a character arrangement position corresponding to an input position of a character to be newly input have been stored in the database DB. Furthermore, the assignment of the second key $K_2$ may be performed when specific retrieval-target names and other retrieval-target names that include the leading character of the ligature-correspondence series characters or the specific ligature in a character arrangement position corresponding to an input position of a character to be newly input have been stored in the database DB.

In step 4b (ST4b) of FIG. 5, when the specific ligature (Lam alif) is input by being selected by the first key $K_1$, specific retrieval-target names including the input specific ligature (Lam alif) in a character arrangement position corresponding to an input position of the specific ligature are retrieved from the database DB by character-string matching. The character-string matching performed in step 4b (ST4b) is direct character-string matching without using the correspondence table TB. Note that, as with the case of step 4a (ST4a)

of the first embodiment shown in FIG. 1, the input position of the specific ligature (Lam alif) corresponds to the first character (leading character) in the example shown in FIG. 5. In this example, a character arrangement position (hereinafter referred to as an "input-ligature-matching-target-character position") corresponding to the input position of the specific ligature (Lam alif) corresponds to the first character. Accordingly, in step 4b (ST4b), the first and second retrieval-target names $N_1$ and $N_2$ that include the ligature "Lam alif" as the first character are detected. Note that, when the input position of the specific ligature (Lam alif) corresponds to the n-th character, the input-ligature-matching-target-character position that is generalized is represented by a character arrangement position of the n-th character. Note that, when fuzzy matching is employed, the input-ligature-matching-target-character position should be obtained after characters to be ignored at a time of character-string matching are removed from the character arrangement.

On the other hand, in this embodiment, as shown in step 5b (ST5b), when the leading character (Lam) of the ligature-correspondence series characters is input by being selected by the second key $K_2$, retrieval-target names which include the input leading character (Lam) in a leading-character-matching-target-character position corresponding to an input position of the leading character (Lam) are retrieved by direct character-string matching. Note that, as with the case of step 5a (ST5a) of the first embodiment shown in FIG. 1, in the example shown in FIG. 5, the input position of the leading character (Lam) corresponds to the first character (leading character). In this example, since the leading-character-matching-target-character position corresponds to the first character, the third retrieval-target name $N_3$ including the character (Lam) as the first character is detected in step 5b (ST5b).

Furthermore, in step 5b (ST5b), the specific ligature (Lam alif) corresponding to the input leading character (Lam) is obtained in accordance with the correspondence table TB stored in the storage device M. Then, specific retrieval-target names, including the obtained specific ligature (Lam alif) in a character arrangement position (hereinafter referred to as an "obtained-ligature-matching-target-character position") corresponding to the input position of the leading character (Lam), are retrieved from the database DB by character-string matching. This character-string matching is indirect character-string matching using the correspondence table TB. As described above, in the example shown in FIG. 5, since the input position of the leading character (Lam) corresponds to the first character, the obtained-ligature-matching-target-character position corresponds to the first character. Therefore, in the example shown in FIG. 5, the first and second retrieval-target names $N_1$ and $N_2$ that include the ligature (Lam alif) as the first character are detected in step 5b (ST5b). Note that, when the input position of the leading character of the ligature-correspondence series characters corresponds to the n-th character, the obtained-ligature-matching-object-character position that is generalized can be represented by a character arrangement position of the n-th character. Note that, when the fuzzy matching is employed, the obtained-ligature-matching-target-character position should be obtained after characters to be ignored at a time of the character-string matching are removed from the character arrangement.

Figure 6:
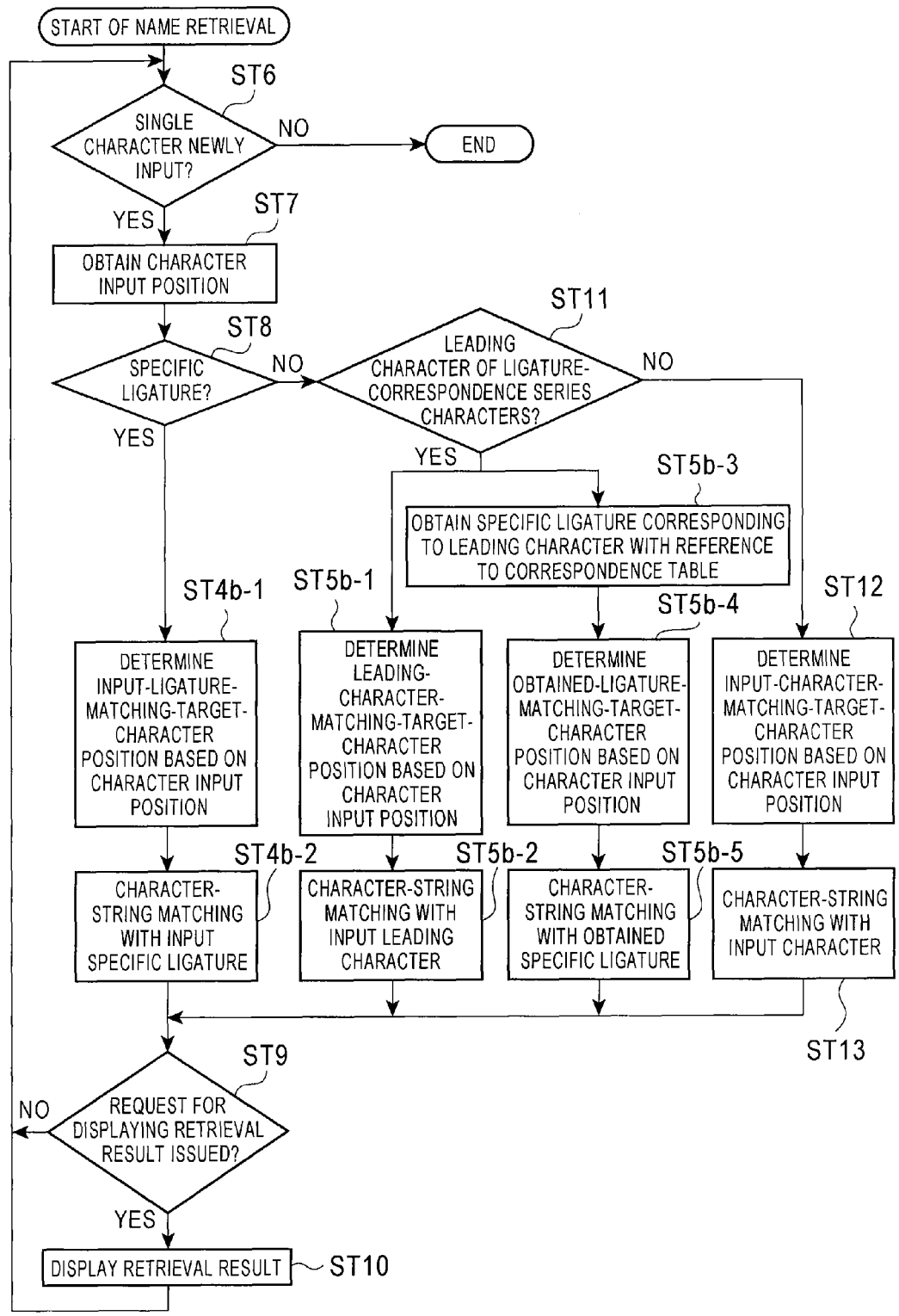
FIG. 6 is a flowchart illustrating the name retrieval method.

Next, a process performed after the retrieval-target names and the correspondence table TB are stored can be generally represented as shown in FIG. 6. Note that portions of a process shown in FIG. 6 are the same as those of the process of the first embodiment shown in FIG. 4, and therefore, only operations unique to this embodiment will be described.

As shown in FIG. 6, in this embodiment, instead of the operations of step 4a-1 (ST4a-1) to step 4a-4 (ST4a-4), operations of step 4b-1 (ST4b-1) and step 4b-2 (ST4b-2) are performed. In step 4b-1 (ST4b-1), an input-ligature-matching-target-character position is determined in accordance with an input position of a character (specific ligature) obtained in step 7 (ST7). Next, in step 4b-2 (ST4b-2), specific retrieval-target names, which include the input specific ligature in the input-ligature-matching-target-character position determined in step 4b-1 (ST4b-1), are retrieved from the database DB by character-string matching. After step 4b-2 (ST4b-2), the process proceeds to step 9 (ST9).

Furthermore, as shown in FIG. 6, in this embodiment, instead of the operations in step 5a-1 (ST5a-1) and step 5a-2 (ST5a-2), operations in step 5b-1 (ST5b-1) to step 5b-5 (ST5b-5) are performed. Note that the operations in step 5b-1 (ST5b-1) and step 5b-2 (ST5b-2) are the same as those in step 5a-1 (ST5a-1) and step 5a-2 (ST5a-2) except that specific retrieval-target names are not detected by these operations.

In step 5b-1 (ST5b-1), a leading-character-matching-target-character position is determined in accordance with the input position of the character (leading character) obtained in step 7 (ST7). Next, in step 5b-2 (ST5b-2), specific retrieval-target-names, which include the input leading character in the leading-character-matching-target-character position determined in step 5b-1 (ST5b-1), are retrieved from the database DB by the character-string matching. After step 5b-2 (ST5b-2), the process proceeds to step 9 (ST9).

On the other hand, the operations in step 5b-3 (ST5b-3) to step 5b-5 (ST5b-5) are unique to this embodiment. Specifically, in step 5b-3 (ST5b-3), a specific ligature corresponding to the input leading character is obtained with reference to the correspondence table TB.

In step 5b-4 (ST5b-4), an obtained-ligature-matching-target-character position is determined in accordance with the input position of the character (leading character) obtained in step 7 (ST7).

Subsequently, in step 5b-5 (ST5b-5), specific retrieval-target names, which include the specific ligature obtained in step 5b-3 (ST5b-3) in the obtained-ligature-matching-target-character position determined in step 5b-4 (ST5b-4), are retrieved from the database DB by the character-string matching. After step 5b-5 (ST5b-5), the process proceeds to step 9 (ST9).

In this embodiment, when the specific ligature is input, specific retrieval-target names that include the input specific ligature in the input-ligature-matching-target-character position can be retrieved. On the other hand, when a leading character of ligature-correspondence series characters is input, retrieval-target names that include the input leading character in a leading-character-matching-target-character position are retrieved, a specific ligature corresponding to the input leading character is obtained in accordance with the correspondence table TB, and specific retrieval-target names which include the obtained specific ligature in the obtained-ligature-matching-target-character position are retrieved. By this, as with the first embodiment, specific retrieval-target names can be detected in both the case where the specific ligature is input and the case where the leading character of the ligature-correspondence series characters is input.

Note that modifications assumed to be generated from the first embodiment can be applicable to this embodiment where appropriate.

A Third Embodiment of a Name Retrieval Method

Next, implementations of a third embodiment of a name retrieval method will be described below with reference to FIGS. 7 and 8, mainly in points which are different from the first and second embodiments of the name retrieval methods described above. An outline of the name retrieval method in this embodiment is shown in FIG. 7.

In this embodiment, the specific retrieval-target names described above are stored in a database DB as character strings, including a specific ligature or character strings including ligature-correspondence series characters without change as shown in step 1*c* (ST1*c*). Specifically, in step 1*c* (ST1*c*), when original data D is compiled by a compiler into the database DB, all specific retrieval-target names among retrieval-target names stored in the original data D are stored in the database DB as character strings which include the specific ligature or character strings which include the ligature-correspondence series characters without change. Note that, as shown in FIG. 7, the retrieval-target names stored in the original data D are the same as those shown in FIGS. 1 and 5.

More specifically, in step 1*c* (ST1*c*), a specific retrieval-target name (first retrieval-target name $N_1$), which includes a specific ligature (Lam alif) and which is stored in the original data D, is stored in the database DB as character string data without changing the number of characters, types of character, and arrangement of the characters. Furthermore, a specific retrieval-target name (second retrieval-target name $N_2$), which includes ligature-correspondence series characters (Lam+alif) and which is stored in the original data D, is also stored in the database DB as character string data without changing the number of characters, types of character, and arrangement of the characters. Note that a retrieval-target name (third retrieval-target name $N_3$), which is other than the specific retrieval-target names and which is stored in the original data D, is stored in the database DB similarly to the first and second embodiment.

Figure 7:
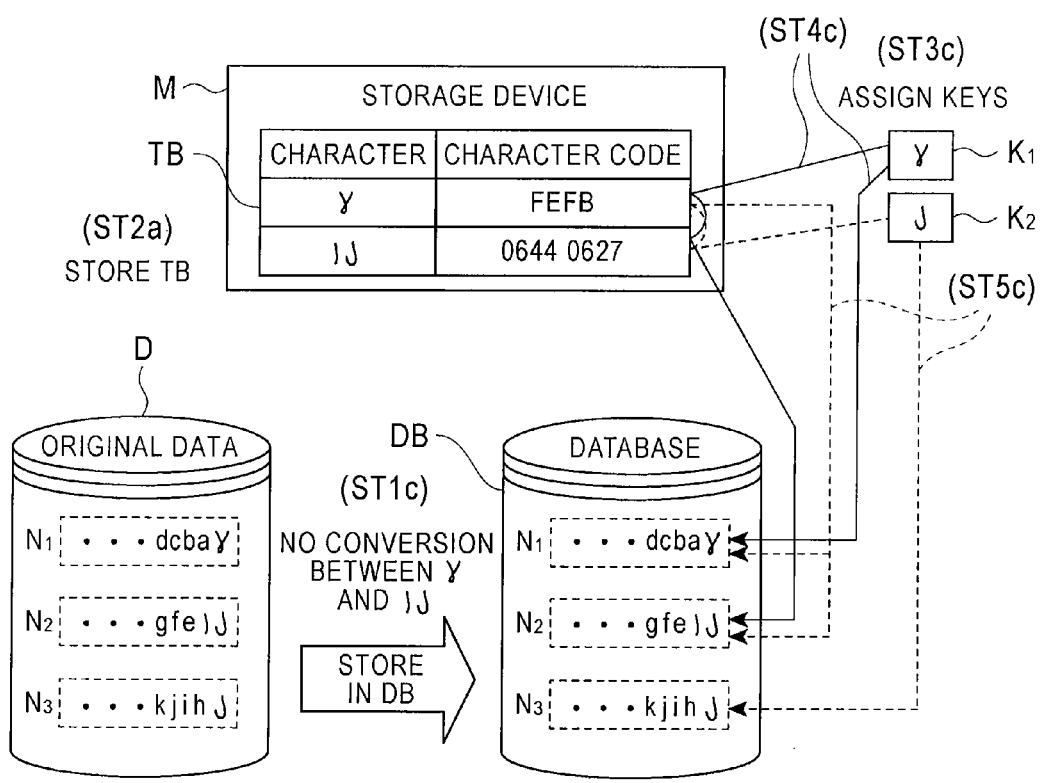
FIG. 7 is a conceptual diagram illustrating a third embodiment of a name retrieval method.

Next, a correspondence table TB representing the correspondence relationship between the specific ligature (Lam alif) and the ligature-correspondence series characters (Lam+alif) is stored in the storage device M as shown in step 2*c* (ST2*c*) of FIG. 7. This process is the same as that in step 2*a* (ST2*a*) of the first embodiment, and therefore, a description thereof is also the same as that of the first embodiment.

Then, in step 3*c* (ST3*c*) of FIG. 7, a first key $K_1$ used to input the specific ligature (Lam alif) and a second key $K_2$ used to input a leading character (Lam) of the ligature-corresponding series characters (Lam+alif) are assigned to an input device. This process is the same as that in step 3*a* (ST3*a*) of the first embodiment, and therefore, a description thereof is also the same as that of the first embodiment. Note that, in this embodiment, the assignment of the first key $K_1$ may be performed when a specific retrieval-target name including the specific ligature in a character arrangement position corresponding to an input position of a character to be newly input or in a character arrangement position corresponding to an input position of a series of characters to be newly input has been stored in the database DB. Furthermore, the assignment of the second key $K_2$ may be performed when a specific retrieval-target name or another retrieval-target name, which includes a leading character of ligature-correspondence series characters or a specific ligature in a character arrangement position corresponding to an input position of a character to be newly input, has been stored in the database DB.

Next, in this embodiment, as shown in step 4*c* (ST4*c*) of FIG. 7, when the specific ligature (Lam alif) is input by being selected by the first key $K_1$, a process obtained by combining the operation in step 4*a* (ST4*a*) of the first embodiment shown in FIG. 1 and the operation in step 4*b* (ST4*b*) of the second embodiment shown in FIG. 5 with each other is performed.

Specifically, in step 4*c* (ST4*c*), specific retrieval-target names, which include the input specific ligature (Lam alif) in an input-ligature-matching-target-character position, are retrieved from the database DB by character-string matching. In the example shown in FIG. 7, the first retrieval-target name $N_1$ including the ligature (Lam alif) as the first character is detected.

Furthermore, in step 4*c* (ST4*c*), the input specific ligature (Lam alif) is converted into the ligature-correspondence series characters corresponding to the ligature (Lam alif) in accordance with the correspondence table TB stored in the storage device M. Then, specific retrieval-target names including the ligature-correspondence series characters (Lam+alif) obtained by the conversion as a series-character-matching-target-character-position group are retrieved from the database DB by the character-string matching. In the example shown in FIG. 7, the second retrieval-target name $N_2$ that includes the character (Lam) as the first character and a character (alif) as the second character is detected.

On the other hand, in this embodiment, as shown in step 5*c* (ST5*c*) of FIG. 7, when the leading character of the ligature-correspondence series characters is input by being selected by the second key $K_2$, a process obtained by combining the operation in step 5*a* (ST5*a*) of the first embodiment shown in FIG. 1 and the operation in step 5*b* (ST5*b*) of the second embodiment shown in FIG. 5 with each other is performed.

Specifically, in step 5*c* (ST5*c*), specific retrieval-target names and other retrieval-target names that include the input leading character (Lam) in a leading-character-matching-target-character position are retrieved from the database DB by character-string matching. In the example shown in FIG. 7, the second and third retrieval-target names $N_2$ and $N_3$ that include the character (Lam) as the first character are detected.

Furthermore, in step 5*c* (ST5*c*), the specific ligature (Lam alif) corresponding to the input leading character is obtained in accordance with the correspondence table TB stored in the storage device M. Then, specific retrieval-target names including the obtained specific ligature (Lam alif) in an obtained-ligature-matching-target-character position are retrieved from the database DB by the character-string matching. Therefore, in the example shown in FIG. 7, the first retrieval-target name $N_1$ that includes the ligature (Lam alif) as the first character is detected in this retrieval.

Figure 8:
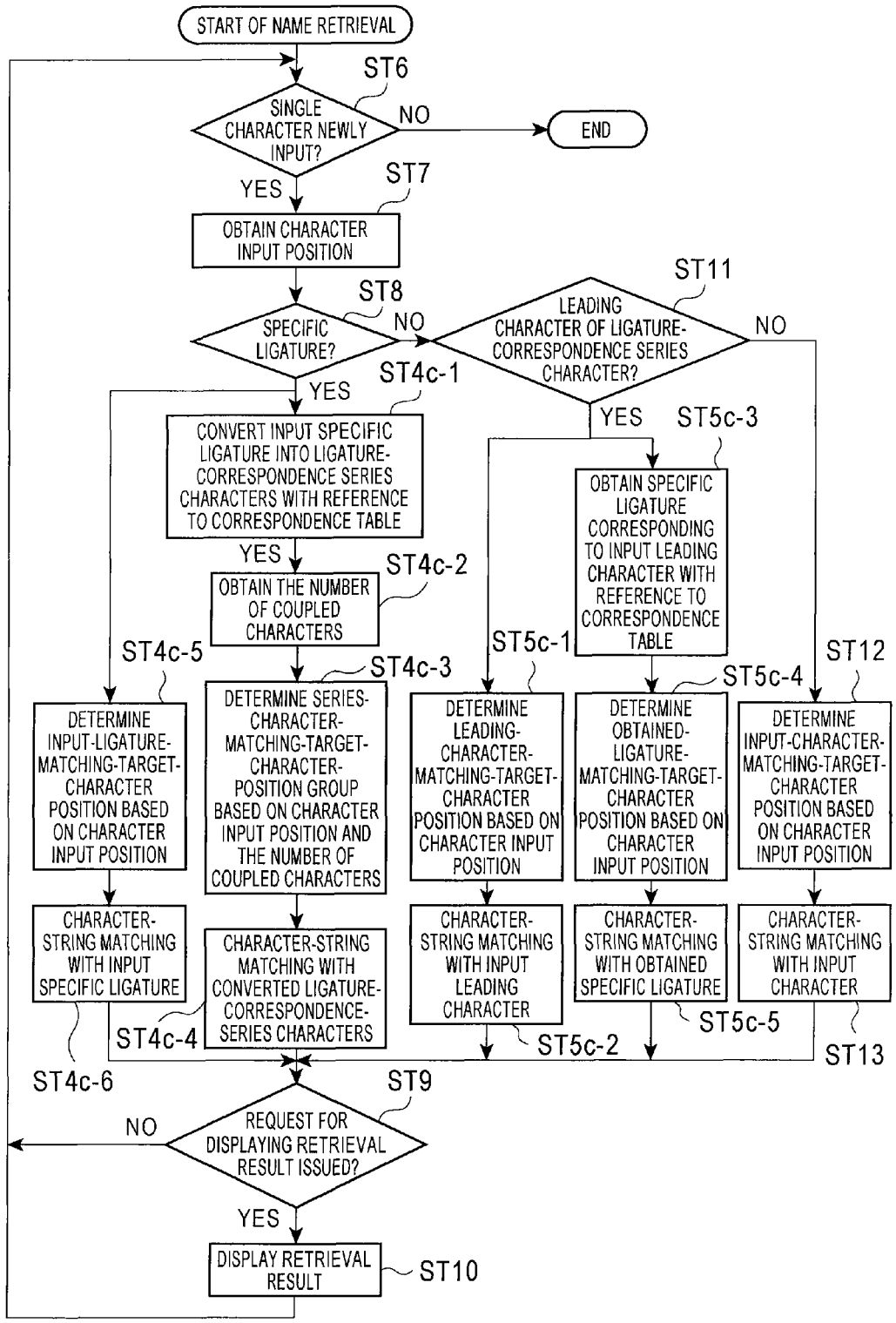
FIG. 8 is a flowchart illustrating the name retrieval method.

Next, a process performed after the retrieval-target names and the correspondence table TB are stored can be represented as shown in FIG. 8 by generalization. Note that the process shown in FIG. 8 is partially overlapped with the process of the first embodiment shown in FIG. 4 and the process of the second embodiment shown in FIG. 6, and therefore, the overlapped portions are clearly described as needed and descriptions thereof are omitted.

As shown in FIG. 8, operations in step 4*c*-1 (ST4*c*-1) to step 4*c*-4 (ST4*c*-4) are performed instead of the series of operations of step 4*a*-1 (ST4*a*-1) to step 4*a*-4 (ST4*a*-4) of the first embodiment shown in FIG. 4. By this, as with the first embodiment, specific retrieval-target names that include ligature-correspondence series characters obtained by conversion using the correspondence table TB as series-character-matching-target-character-position group are retrieved.

As shown in FIG. 8, operations in step 4*c*-5 (ST4*c*-5) and step 4*c*-6 (ST4*c*-6) are performed instead of the series of operations of step 4*b*-1 (ST4*b*-1) and step 4*b*-2 (ST4*b*-2) of the second embodiment shown in FIG. 6. By this, as with the second embodiment, specific retrieval-target names that include an input specific ligature in an input-ligature-matching-target-character position are retrieved.

Furthermore, as shown in FIG. 8, in this embodiment, operations in step 5c-1 (ST5c-1) and step 5c-2 (ST5c-2) are performed instead of the series of operations of step 5a-1 (ST5a-1) and step 5a-2 (ST5a-2) of the first embodiment shown in FIG. 4. By this, as with the first embodiment, specific retrieval-target names that include a leading character of input ligature-correspondence series characters in a leading-character-matching-target-character position are retrieved.

Furthermore, as shown in FIG. 8, in this embodiment, operations in step 5c-3 (ST5c-3) to step 5c-5 (ST5c-5) are performed instead of the series of operations of step 5b-3 (ST5b-3) to step 5b-5 (ST5b-5) of the second embodiment shown in FIG. 6. By this, as with the second embodiment, specific retrieval-target names, including a specific ligature obtained in accordance with the correspondence table TB in an obtained-ligature-matching-target-character position, are retrieved.

Other operations shown in FIG. 8 are the same as those having reference numerals shown in FIGS. 4 and 6, and therefore, descriptions thereof are omitted.

According to this embodiment, when a specific ligature is input, specific retrieval-target names that include the input specific ligature in an input-ligature-matching-target-character position are retrieved, the specific ligature is converted into ligature-correspondence series characters in accordance with the correspondence table TB, and specific retrieval-target names that include the ligature-correspondence series characters obtained by the conversion in a series-character-matching-target-character-position group are retrieved. On the other hand, when a leading character of the ligature-correspondence series characters is input, specific retrieval-target names and other retrieval-target names that include the input leading character in a leading-character-matching-target-character position are retrieved, a specific ligature corresponding to the input leading character is obtained in accordance with the correspondence table TB, and specific retrieval-target names that include the obtained specific ligature in an obtained-ligature-matching-target-character position are retrieved. Accordingly, as with the first and second embodiments, specific retrieval-input names can be detected in both the case where the specific ligature is input and the case where the leading character of the ligature-correspondence series characters is input.

Note that modifications which may be generated from the first embodiment are applicable to this embodiment where appropriate.

A Fourth Embodiment of a Name Retrieval Apparatus

Figure 9:
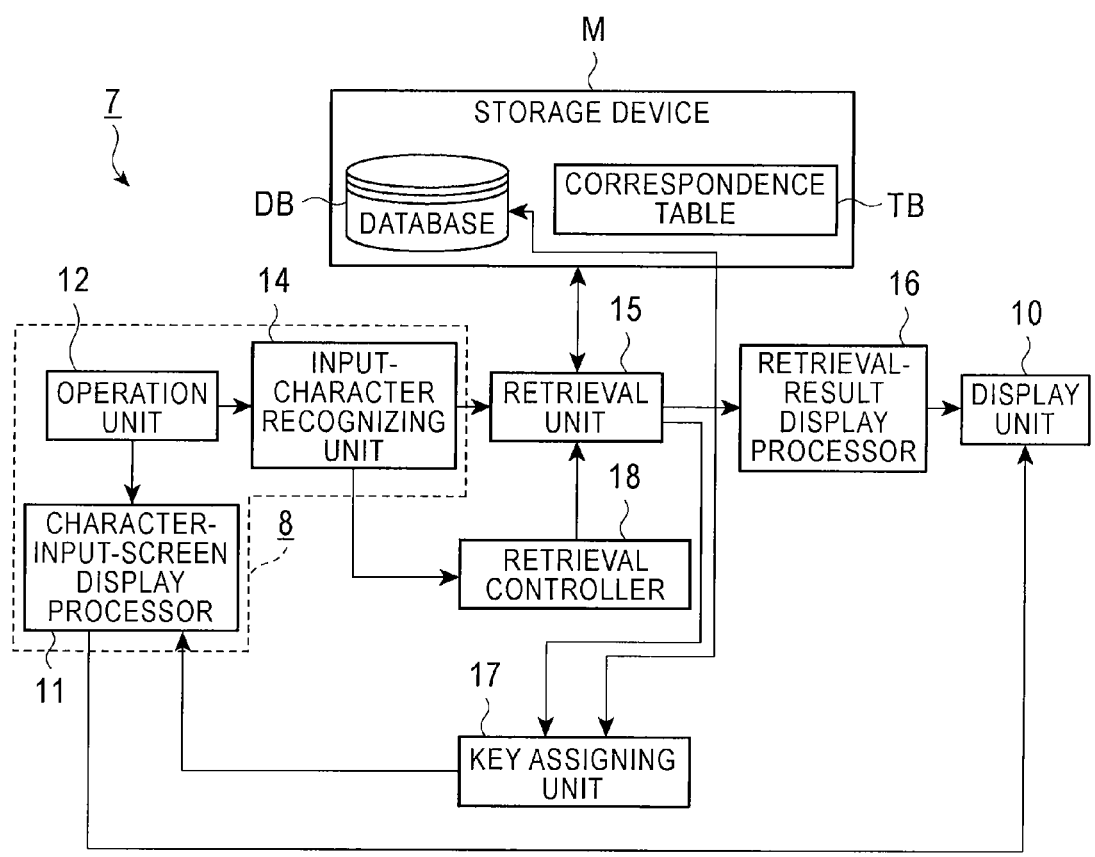
FIG. 9 is a block diagram illustrating a fourth embodiment of a name retrieval apparatus.

Implementations of a fourth embodiment of a name retrieval apparatus will be described below with reference to FIG. 9. As shown in FIG. 9, a name retrieval apparatus 7 may include a database DB that stores retrieval-target names as character string data. The database DB stores character string data corresponding to specific retrieval-target names that include or do not include a ligature in a state corresponding to one of the name retrieval methods according to the first to third embodiments described above.

Furthermore, as shown in FIG. 9, the name retrieval apparatus 7 may include an input device 8 capable of inputting a character used for name retrieval and a display unit 10 used to display a result of the input of the character performed using the input device 8 and a result of retrieval of a retrieval-target name.

As shown in FIG. 9, the input device 8 includes a character-input-screen-display processor 11, an operation unit 12, and an input-character recognition unit 14. Here, the character-input-screen-display processor 11 causes the display unit 10 to display a character input screen 1 (refer to FIG. 2) used for name retrieval. Furthermore, the operation unit 12 is configured to perform a character input operation using the character input screen 1 displayed with the character-input-screen-display processor 11 and to generate an input signal representing the character input operation. For example, when a jog dial is used as the operation unit 12, the input signal represents an angle of rotation, a direction of rotation, or a press of the jog dial. Furthermore, the input-character recognition unit 14 is configured to recognize the input character in accordance with the input signal representing the character input operation performed by the operation unit 12. Note that the character-input-screen-display processor 11 also performs display of movement of a cursor used to specify a character among candidate characters of the character input and partial change of content of the display of the character input screen 1 such as change of display of the candidate characters in accordance with the input signal supplied from the operation unit 12.

Furthermore, as shown in FIG. 9, the name retrieval apparatus 7 includes a retrieval unit 15 serving as a retrieval device. The retrieval unit 15 performs retrieval such that retrieval-target names including a character input using the input device 8 are retrieved from the database DB by sequentially performing search refinement every time a character is input.

Furthermore, as shown in FIG. 9, the name retrieval apparatus 7 includes a retrieval-result display processor 16 serving as a retrieval-result display device. The retrieval-result display processor 16 can display character strings representing retrieval-target names detected by the retrieval unit 15 in the display unit 10 as a list (refer to FIG. 3). Note that, as for a mode for display of presence or absence of a ligature in a case where character strings representing specific retrieval-target names are displayed as a retrieval result, the retrieval-result display processor 16 appropriately selects one of the various display modes described in the name retrieval method of the first embodiment (for example, a display mode in which a specific ligature should be used for all the specific retrieval-target names).

Moreover, as shown in FIG. 9, the name retrieval apparatus 7 includes a storage device M that stores, in addition to the database DB, a correspondence table TB representing the correspondence relationship described in the name retrieval methods according to the first to third embodiments. Note that, as described above, the correspondence table TB may be stored in the database DB.

Furthermore, as shown in FIG. 9, the name retrieval apparatus 7 includes a key assigning unit 17 serving as a key assigning device. The key assigning unit 17 assigns a first key $K_1$ used to input a specific ligature and a second key $K_2$ used to input a leading character of ligature-correspondence series characters to the input device 8 as described in the name retrieval methods of the first to third embodiments. Note that the key assigning unit 17 may determine whether the first key $K_1$ and the second key $K_2$ are to be assigned as described in the name retrieval method according to the first embodiment in accordance with the retrieval-target names stored in the database DB or a retrieval result currently obtained by the retrieval unit 15.

Furthermore, as shown in FIG. 9, the name retrieval apparatus 7 includes a retrieval controller 18 serving as a retrieval control device. The retrieval controller 18 controls name retrieval performed by the retrieval unit 15.

Specifically, when a state of presence or absence of a ligature in the specific retrieval-target names stored in the database DB corresponds to the state shown in the name retrieval method according to the first embodiment, the retrieval controller 18 instructs the retrieval unit 15 to perform the name retrieval described in the first embodiment.

Furthermore, when a state of presence or absence of a ligature in the specific retrieval-target names stored in the database DB corresponds to the state shown in the name retrieval method according to the second embodiment, the retrieval controller 18 instructs the retrieval unit 15 to perform the name retrieval described in the second embodiment.

Moreover, when a state of presence or absence of a ligature in the specific retrieval-target names stored in the database DB corresponds to the state shown in the name retrieval method according to the third embodiment, the retrieval controller 18 instructs the retrieval unit 15 to perform the name retrieval described in the third embodiment.

Note that the retrieval controller 18 may cause the retrieval unit 15 to perform only one of the name retrieval methods according to the first to third embodiments in a known fixed state of presence or absence of a ligature in the specific retrieval-target names stored in the database DB. Alternatively, the retrieval controller 18 may access the database DB by itself so as to determine one of the states of the name retrieval methods of the first to third embodiments that corresponds to presence or absence of a ligature of specific retrieval-target names, and thereafter, cause the retrieval unit 15 to selectively perform one of the name retrieval methods selected as a result of the determination.

Furthermore, when the name retrieval apparatus 7 is mounted on a navigation apparatus, retrieval-target names detected by the retrieval unit 15 may be displayed as destination candidates using the retrieval-result display processor 16.

In some implementations, a touch pane may be used as the operation unit 12 instead of the jog dial. Additionally, in some implementations, the storage device M may be a hard disk drive. Further, in some implementations, the configuration units, including the character-input-screen-display processor 11, the input-character recognition unit 14, the retrieval unit 15, the retrieval-result display processor 16, the key assigning unit 17, and the retrieval controller 18, may be realized by a ROM which stores programs and data used to execute functions of the units, a CPU which execute the programs stored in the ROM, a RAM which temporarily stores results of processes performed by the CPU, and the like.

According to the name retrieval apparatus 7 of this embodiment, all specific retrieval-target names can be detected in both the case where a specific ligature is input by being selected by the first key $K_1$ and the case where a leading character of ligature-correspondence series characters is input by being selected by the second key $K_2$.

As described in the implementations above, specific retrieval-target names can be detected taking arbitrary property of a ligature into consideration in both the case where a specific ligature is input and the case where a leading character of ligature-correspondence series characters is input, thereby improving the convenience and reliability of name retrieval.

Note that the present invention is not limited to the foregoing embodiments and various modifications may be made as long as features of the present invention are degraded.

For example, the present invention may be effectively applicable to name retrieval which uses languages employing ligatures other than ligatures in the Arabic language such as Devanagari characters used in the Sanskrit language and Burmese characters used in the Myanmar's language.

Furthermore, in the character input screen 1, characters corresponding to a plurality of language such as the Arabic language and the English language (Latin language) may be input. Furthermore, it is apparent that numbers and symbols may also be included in input available characters.

It is therefore intended that the foregoing detailed description be regarded as illustrative rather than limiting, and that it be understood that it is the following claims, including all equivalents, that are intended to define the spirit and scope of this invention.

What is claimed is:

1. A name retrieval apparatus comprising:
   a database configured to store retrieval-target names as character string data and to store specific retrieval-target names, among the retrieval-target names, which are representable as character strings including a specific ligature obtained by coupling specific characters arranged in series with each other in a specific order as a single character and which are representable as character strings including the series of specific characters without change, as character strings having the series of characters without change;
   an input device configured to provide character input for retrieval of the retrieval-target names;
   a retrieval device configured to retrieve from the database the retrieval-target names that include a character input using the input device by sequentially performing search refinement every time a character is input;
   a retrieval-result display device configured to display a result of the retrieval performed by the retrieval device;
   a storage device configured to store the correspondence relationship between the specific ligature and the series of characters;
   a key assigning device configured to assign a first key used to input the specific ligature and a second key used to input a leading character of the series of characters to the input device; and
   a retrieval control device configured to control the retrieval of the retrieval-target names performed by the retrieval device,
   wherein, when the specific ligature is input by being selected by the first key, the retrieval control device is configured to cause the retrieval device to convert the input specific ligature into the series of characters corresponding to the specific ligature in accordance with the correspondence relationship stored in the storage device and to retrieve the specific retrieval-target names that include the series of characters that are obtained by the conversion in an input position of the specific ligature and in a character arrangement position of the series of characters corresponding to the number of coupled characters from the database by character-string matching, and
   when the leading character is input by being selected by the second key, the retrieval control device causes the retrieval device to retrieve the specific retrieval-target names and the other retrieval-target names which include the input leading character in a character arrangement position corresponding to an input position of the leading character from the database by the character-string matching.

2. The name retrieval apparatus of claim 1, wherein the key assigning device is configured to assign the first key when the specific retrieval-target names that include the series of characters in a character arrangement position corresponding to an input position of series of characters to be newly input have been stored in the database, and wherein the key assigning device is configured to assign the second key when the specific retrieval-target names and the other retrieval-target names that include the leading character in a character arrangement position corresponding to an input position of a character to be newly input have been stored in the database.

3. The name retrieval apparatus of claim 1, wherein the retrieval-result display device displays all the specific retrieval-target names detected by the retrieval device as character strings including the specific ligature.

4. The name retrieval apparatus of claim 1, wherein the retrieval-result display device displays all the specific retrieval-target names detected by the retrieval device as character strings including the series of characters without change.

5. The name retrieval apparatus of claim 1, wherein the retrieval-result display device displays the specific retrieval-target names detected by the retrieval device as character strings including the specific ligature or the series of characters in accordance with a character input for the retrieval.

6. The name retrieval apparatus of claim 1, wherein the retrieval-result display device displays specific retrieval-target names, among the specific retrieval-target names detected by the retrieval device, which include a certain ligature as the specific ligature as character strings including the certain ligature and displays specific retrieval-target names, among the specific retrieval-target names detected by the retrieval device, which include the specific ligature other than certain ligature as character strings which include the series of characters without change.

7. The name retrieval apparatus of claim 1, wherein a language of character strings representing the retrieval-target names and a language of a character used to perform retrieval of the retrieval-target names include the Arabic language.

8. The name retrieval apparatus of claim 1, wherein the name retrieval apparatus is mounted on a navigation apparatus, and wherein the retrieval-target names include at least one of an address name, a POI name, and a street name.

9. A name retrieval apparatus comprising:

a database configured to store retrieval-target names as character string data and to store all specific retrieval-target names, among the retrieval-target names, which are representable as character strings including a specific ligature obtained by coupling specific characters arranged in series with each other in a specific order as a single character and which are representable as character strings including the series of specific characters without change, as character strings having the specific ligature;

an input device configured to provide character input for retrieval of the retrieval-target names;

a retrieval device configured to retrieve from the database the retrieval-target names that include a character input using the input device by sequentially performing search refinement every time a character is input;

a retrieval-result display device configured to display a result of the retrieval performed by the retrieval device;

a storage device configured to store the correspondence relationship between the specific ligature and the series of characters;

a key assigning device configured to assign a first key used to input the specific ligature and a second key used to input a leading character of the series of characters to the input device; and a retrieval control device configured to control retrieval of the retrieval-target names performed by the retrieval device, wherein, when the specific ligature is input by being selected by the first key, the retrieval control device is configured to cause the retrieval device to retrieve the specific retrieval-target names that include the input specific ligature in a character arrangement position corresponding to an input position of the specific ligature from the database by character-string matching, and wherein, when the leading character is input by being selected by the second key, the retrieval control device is configured to cause the retrieval device to retrieve the retrieval-target names that include the input leading character in a character arrangement position corresponding to an input position of the leading character from the database by the character-string matching, to obtain the specific ligature corresponding to the input leading character in accordance with the correspondence relationship stored in the storage device, and to retrieve the specific retrieval-target names that include the obtained specific ligature in a character arrangement position corresponding to the input position of the leading character from the database by the character-string matching.

10. The name retrieval apparatus of claim 9, wherein the key assigning device is configured to assign the first key when the specific retrieval-target names that include the specific ligature in a character arrangement position corresponding to an input position of a character to be newly input have been stored in the database, and wherein the key assigning device is configured to assign the second key when the specific retrieval-target names and the other retrieval-target names that include the leading character or the specific ligature in a character arrangement position corresponding to an input position of a character to be newly input have been stored in the database.

11. A name retrieval apparatus comprising:

a database configured to store retrieval-target names as character string data and to store all specific retrieval-target names, among the retrieval-target names, which are representable as character strings including a specific ligature obtained by coupling specific characters arranged in series with each other in a specific order as a single character and which are representable character strings including the series of specific characters without change, as character strings having the specific ligature or as character strings having the series of characters without change;

an input device configured to provide character input for retrieval of the retrieval-target names;

a retrieval device configured to retrieve from the database the retrieval-target names that include a character input using the input device by sequentially performing search refinement every time a character is input;

a retrieval-result display device configured to display a result of the retrieval performed by the retrieval device;

a storage device configured to store the correspondence relationship between the specific ligature and the series of characters;

a key assigning device configured to assign a first key used to input the specific ligature and a second key used to input a leading character of the series of characters to the input device; and a retrieval control device configured to control retrieval of the retrieval-target names performed by the retrieval device, wherein, when the specific ligature is input by being selected by the first key, the retrieval control device is configured to cause the retrieval device to retrieve the specific retrieval-target names that include the input specific ligature in a character arrangement position corresponding to an input position of the specific ligature from the database by character-string matching, to convert the input specific ligature into the series of characters in accordance with the corresponding relationship stored in the storage device, and to retrieve the specific retrieval-target names that include the series of characters obtained by the conversion in an input position of the specific ligature and in a character arrangement position of the series of characters corresponding to the number of coupled characters from the database by the character-string matching, and wherein, when the leading character is input by being selected by the second key, the retrieval control device is configured to cause the retrieval device to retrieve the specific retrieval-target names and the other retrieval-target names which include the input leading character in a character arrangement position corresponding to an input position of the leading character from the database by the character-string matching, to obtain the specific ligature corresponding to the input leading character in accordance with the correspondence relationship stored in the storage device, and to retrieve the specific retrieval-target names which include the obtained specific ligature in a character arrangement position corresponding to the input position of the leading character from the database by the character-string matching.

12. The name retrieval apparatus according to claim 11, wherein the key assigning device is configured to assign the first key when the specific retrieval-target names that include the specific ligature in a character arrangement position corresponding to a character to be newly input or the specific retrieval-target names which include the series of characters in a character arrangement position corresponding to an input position of series of characters to be newly input have been stored in the database, and wherein the key assigning device is configured to assign the second key when the specific retrieval-target names and the other retrieval-target names that include the leading character or the specific ligature in a character arrangement position corresponding to an input position of a character to be newly input have been stored in the database.

13. A name retrieval method to store retrieval-target names in a database as character string data, to retrieve the retrieval-target names which include a character input by an input device by sequentially performing search refinement every time a character is input, and to display a result of the retrieval in a display unit, the name retrieval method comprising:

storing, in the database, all specific retrieval-target names, among the retrieval-target names, which are representable as character strings including a specific ligature obtained by coupling specific characters arranged in series with each other in a specific order as a single character and which are representable as character strings including the series of specific characters without change, as character strings having the series of characters without change;

storing the correspondence relationship between the specific ligature and the series of characters in a storage device;

assigning a first key used to input the specific ligature and a second key used to input a leading character of the series of characters to the input device;

converting the input specific ligature into the series of characters corresponding to the specific ligature in accordance with the correspondence relationship stored in the storage device and retrieving the specific retrieval-target names that include the series of characters that are obtained by the conversion in an input position of the specific ligature and in a character arrangement position of the series of characters corresponding to the number of coupled characters from the database by character-string matching, when the specific ligature is input by being selected by the first key; and retrieving the specific retrieval-target names and the other retrieval-target names that include the input leading character in a character arrangement position corresponding to an input position of the leading character from the database by the character-string matching, when the leading character is input by being selected by the second key.

14. A name retrieval method to store retrieval-target names in a database as character string data, to retrieve the retrieval-target names which include a character input by an input device by sequentially performing search refinement every time a character is input, and to display a result of the retrieval in a display unit, the name retrieval method comprising:

storing, in the database, all specific retrieval-target names, among the retrieval-target names, which are representable as character strings including a specific ligature obtained by coupling specific characters arranged in series with each other in a specific order as a single character and which are representable as character strings including the series of specific characters without change, as character strings having the specific ligature;

storing the correspondence relationship between the specific ligature and the series of characters in a storage device;

assigning a first key used to input the specific ligature and a second key used to input a leading character of the series of characters to the input device;

retrieving the specific retrieval-target names that include the input specific ligature in a character arrangement position corresponding to an input position of the specific ligature from the database by character-string matching, when the specific ligature is input by being selected by the first key; and retrieving the retrieval-target names that include the input leading character in a character arrangement position corresponding to an input position of the leading character from the database by the character-string matching, obtaining the specific ligature corresponding to the input leading character in accordance with the correspondence relationship stored in the storage device, and retrieving the specific retrieval-target names that include the obtained specific ligature in a character arrangement position corresponding to the input position of the leading character from the database by the character-string matching, when the leading character is input by being selected by the second key.

15. A name retrieval method to store retrieval-target names in a database as character string data, to retrieve the retrieval-target names which include a character input by an input device by sequentially performing search refinement every time a character is input, and to display a result of the retrieval in a display unit, the name retrieval method comprising:

storing, in the database, specific retrieval-target names, among the retrieval-target names, which are representable as character strings including a specific ligature obtained by coupling specific characters arranged in series with each other in a specific order as a single character and which are representable as character strings including the series of specific characters without change, as character strings having the specific ligature or character strings having the series of characters without change;

storing the correspondence relationship between the specific ligature and the series of characters in a storage device;

assigning a first key used to input the specific ligature and a second key used to input a leading character of the series of characters to the input device;

retrieving the specific retrieval-target names that include the input specific ligature in a character arrangement position corresponding to an input position of the specific ligature from the database by character-string matching, converting the input specific ligature into the series of characters corresponding to the specific ligature in accordance with the correspondence relationship stored in the storage device, and retrieving the specific retrieval-target names which include the series of characters obtained by the conversion in an input position of the specific ligature and an arrangement position of the series of characters corresponding to the number of coupled characters from the database by the character-string matching, when the specific ligature is input by being selected by the first key; and retrieving the specific retrieval-target names and the other retrieval-target names which include the input leading character in a character arrangement position corresponding to an input position of the leading character from the database by the character-string matching, obtaining the specific ligature corresponding to the input leading character in accordance with the correspondence relationship stored in the storage device, and retrieving the specific retrieval-target names which include the obtained specific ligature in a character arrangement position corresponding to the input position of the leading character from the database by the character-string matching, when the leading character is input by being selected by the second key.

* * * * *